US012189341B2

(12) United States Patent
Fleury et al.

(10) Patent No.: US 12,189,341 B2
(45) Date of Patent: Jan. 7, 2025

(54) SYSTEM FOR DRIVING AND HOLDING IN POSITION A MOBILE UNIT FOR DISPLAYING TIME OR TIME DERIVATIVE INFORMATION

(71) Applicant: ROLEX SA, Geneva (CH)

(72) Inventors: Christian Fleury, Geneva (CH); Florent Millet, Geneva (CH)

(73) Assignee: ROLEX SA, Geneva (CH)

( * ) Notice: Subject to any disclaimer, the term of this patent is extended or adjusted under 35 U.S.C. 154(b) by 468 days.

(21) Appl. No.: 17/499,905

(22) Filed: Oct. 13, 2021

(65) Prior Publication Data

US 2022/0113678 A1 Apr. 14, 2022

(30) Foreign Application Priority Data

Oct. 14, 2020 (EP) .................................... 20201888

(51) Int. Cl.
*G04B 19/253* (2006.01)
*G04B 11/00* (2006.01)

(52) U.S. Cl.
CPC ...... *G04B 19/25373* (2013.01); *G04B 11/006* (2013.01)

(58) Field of Classification Search
None
See application file for complete search history.

(56) References Cited

U.S. PATENT DOCUMENTS

| | | | |
|---|---|---|---|
| 3,667,211 | A | 6/1972 | Schneider |
| 4,081,950 | A | 4/1978 | Chappatte |
| 4,240,249 | A | 12/1980 | Malkin et al. |
| 7,242,640 | B2 | 7/2007 | Fleury |
| 8,760,975 | B2 | 6/2014 | Rudaz |
| 9,395,691 | B2 | 7/2016 | Fleury et al. |
| 9,471,037 | B2 | 10/2016 | Fleury et al. |
| 10,437,198 | B2 | 10/2019 | La China et al. |

(Continued)

FOREIGN PATENT DOCUMENTS

| | | | |
|---|---|---|---|
| CH | 525507 | A | 8/1971 |
| CH | 591720 | B5 | 9/1977 |

(Continued)

OTHER PUBLICATIONS

European Search Report and Written Opinion dated Mar. 2, 2021 in priority application No. EP20201888.3; with English machine translation (total 15 pages).

*Primary Examiner* — Renee S Luebke
*Assistant Examiner* — Matthew Hwang
(74) *Attorney, Agent, or Firm* — Seckel IP, PLLC

(57) ABSTRACT

A system (90) for driving and holding in position a mobile unit (50) for displaying time or time derivative information includes a device (80) for driving a mobile unit (50) including a driving cam (13) and a driving lever (30) provided to drive a driving member (23), a device (40) for holding a mobile unit (50) in position, a device (70) for activating and deactivating the position-holding device (40) including a deactivation cam (22), and a device (12, 21) for mechanically coupling or synchronizing the driving cam (13) and the deactivation cam (22). In one embodiment, the driving cam and the deactivation cam have separate rotation axes and are linked by a gear mechanism. In another embodiment, the driving cam and the deactivation cam are coaxial.

20 Claims, 15 Drawing Sheets

(56) References Cited

U.S. PATENT DOCUMENTS

| | | | |
|---|---|---|---|
| 2005/0254350 A1 | 11/2005 | Fleury | |
| 2012/0057434 A1* | 3/2012 | Rudaz ................ | G04B 19/2538 368/220 |
| 2014/0355396 A1 | 12/2014 | Fleury et al. | |
| 2014/0362670 A1 | 12/2014 | Fleury et al. | |
| 2017/0153604 A1 | 6/2017 | La China et al. | |

FOREIGN PATENT DOCUMENTS

| | | | |
|---|---|---|---|
| EP | 1596261 | A1 | 11/2005 |
| EP | 2428855 | A1 | 3/2012 |
| EP | 3173877 | A1 | 5/2017 |
| WO | 2013102600 | A2 | 7/2013 |

* cited by examiner

II - II

I - I

SYSTEM FOR DRIVING AND HOLDING IN POSITION A MOBILE UNIT FOR DISPLAYING TIME OR TIME DERIVATIVE INFORMATION

This application claims priority of European patent application No. EP20201888.3 filed Oct. 14, 2020, the content of which is hereby incorporated by reference herein in its entirety.

BACKGROUND ART

The invention relates to a system for driving and holding in position a mobile unit for displaying time or time derivative information. The invention relates also to a horological calendar system comprising such a driving and position-holding system. The invention relates also to a movement comprising such a driving and position-holding system or such a horological calendar system. The invention relates also to a timepiece comprising such a movement, such a driving and position-holding system or such a horological calendar system. The invention relates also to a method for operating such a timepiece, such a movement, such a driving and position-holding system or such a horological calendar system.

The document CH525507 discloses a date driving mechanism that disarms a jumper of a date disk at the moment of the instantaneous triggering of the date transition. The energy necessary for the date transition is accumulated in a return spring arranged between a date driving wheel and a date finger. Before midnight, i.e. before the triggering of the date transition, the date finger is retained by the date disk, which is itself retained by the jumper armed by a jumper cam. This jumper cam is linked kinematically to the date driving wheel that makes one revolution in 24 hours. At midnight, a notch arranged on the perimeter of the jumper cam disarms the jumper. At this precise moment, the energy accumulated by the return spring then becomes sufficient for the date finger to be able to overcome the jumper, generating the driving of the date disk to the next date.

By being linked to the date driving wheel, the rotation of the jumper cam is a dragging rotation, which does not allow the jumper to be rearmed instantaneously after the date transition. The result thereof is therefore a degraded functionality of the calendar and an angular play of the date disk that is potentially perceptible, for the time it takes for the jumper to be rearmed by the jumper cam. Such a play is unacceptable for a luxury timepiece. Moreover, in a particular case in which it would be possible to carry out a rapid setting of the date, such a configuration of the jumper and of the jumper cam could generate malfunctions and/or might not allow the expected torques to be generated, which would prejudice the quality of the sensations felt on the stem.

The document U.S. Pat. No. 4,240,249 describes a calendar system that makes it possible to display the date and the day of the week. It comprises a date disk driven by a date finger secured to an energy storage wheel, and a days disk comprising a Maltese cross driven by a pin. The latter is also secured to said storage wheel. The storage wheel is coaxial to a calendar driving wheel that makes one revolution in 24 hours. A spring arranged between the calendar driving wheel and the storage wheel makes it possible to accumulate the energy necessary for the instantaneous transition of the date and day displays. The storage wheel and the calendar driving wheel are both driven by the hours wheel on two distinct levels with different transmission ratios. The storage wheel revolves more slowly than the calendar driving wheel. The relative speed between the two wheels allows for the arming of the return spring. A portion of the toothing is truncated on the perimeter of the storage wheel. It allows the rotation of the storage wheel at midnight, independently of the driving wheel, therefore generating the restoration of the energy accumulated by the return spring and the instantaneous driving of the displays. More particularly, the date finger drives the date disk by one pitch and, simultaneously, the pin drives the Maltese cross, secured to the days disk, also by one pitch. Furthermore, the Maltese cross also controls the arming of the jumper indexing the date disk. Thus, during the date transition, the jumper is disarmed so as to minimize the energy necessary for the date transition. The use of a Maltese cross to control the date jumper is not optimal with regard to the installation of such a solution in a movement.

The document CH591720 discloses also a calendar mechanism that makes it possible to display the date and the day of the week. It comprises a dragging calendar driver, comprising two coaxial and superposed jumper cams, controlling the arming (or the latching) of a jumper simultaneously indexing the date display and the days display. The first jumper cam comprises a hollow on its outer profile shaped so as to disarm (or unlatch) an elastic part of the jumper upon the date transition. After the jump, the arming (or the latching) of the jumper is performed by the second cam which comprises a finger on its outer profile acting on another, rigid part of the jumper to latch it in the toothings of the displays. The jumper is thus completely latched after the date transition for several hours, until the elastic part of the jumper once again cooperates with the outer profile of the first jumper cam and the other, rigid part of the jumper is released by the second jumper cam. This mechanism presents the drawback of requiring two cams or at least two cam levels to control the arming and the disarming of the jumper. Furthermore, this mechanism is configured so as to latch the jumper, namely completely fix the jumper in a given position, which inevitably generates ranges of non-correction if such a calendar mechanism is provided with a correction device comprising a rapid corrector of the date indication and/or of the day indication.

SUMMARY OF THE INVENTION

The aim of the invention is to provide a system for driving and holding in position a mobile unit for displaying time or time derivative information that makes it possible to improve the systems known from the prior art. In particular, the invention proposes a simple and reliable system which makes it possible to limit the energy necessary to perform the time or time derivative information display jumps.

A driving and position-holding system according to the invention is defined by the following point 1.

1. A system for driving and holding in position a mobile unit for displaying time or time derivative information, notably for displaying dates, comprising:
   - a driving device for driving a mobile unit comprising a driving cam and a driving lever provided to drive a driving member,
   - a device for holding a mobile unit in position,
   - a device for activating and deactivating the position-holding device comprising a deactivation cam, and
   - a device for mechanically coupling or synchronizing the driving cam and the deactivation cam.

Different embodiments of the system are defined by the following points 2 to 8.

2. The system as defined in the preceding point, wherein the driving cam and the driving lever are arranged so as to drive, instantaneously, the display mobile unit for displaying time or time derivative information.

3. The system as defined in one of the preceding points, wherein the coupling device comprises a gear linking the driving cam and the deactivation cam.

4. The system as defined in one of points 1 and 2, wherein the coupling device comprises a link securing, according to at least one degree of freedom, the driving cam to the deactivation cam, in particular an embedding connection or a rigid joint between the driving cam and the deactivation cam implemented by a stud.

5. The system as defined in one of the preceding points, wherein the system, in particular the driving lever, comprises a driving lever return spring.

6. The system as defined in one of the preceding points, wherein the driving device comprises a driving wheel and a one-way connection device linking the driving wheel and the driving cam.

7. The system as defined in one of the preceding points, wherein the driving device comprises a driving wheel and a mechanical connection linking the driving wheel and the driving cam, the mechanical connection having an angular play in rotation about an axis of rotation of the driving wheel and/or of the driving cam.

8. The system as defined in one of the preceding points, wherein the device for holding the mobile unit in position comprises a jumper comprising:

a jumper body, and a jumper spring, and the activation and deactivation device comprises an action element on the jumper body, and/or the device for holding the mobile unit in position comprises a jumper comprising:

a jumper body, and a jumper spring, and the activation and deactivation device comprises an action element on the jumper spring.

A horological calendar system according to the invention is defined by the following point 9.

9. A horological calendar system comprising:

a mobile unit for displaying time or time derivative information, and a driving and position-holding system as defined in one of the preceding points.

A movement according to the invention is defined by the following point 10.

10. A horological movement comprising a driving and position-holding system as defined in one of points 1 to 8 and/or a horological calendar system as defined in the preceding point.

A timepiece according to the invention is defined by the following point 11.

11. A timepiece in particular a wristwatch, comprising a driving and position-holding system as defined in one of points 1 to 8 and/or a horological calendar system as defined in point 9 and/or a movement as defined in the preceding point.

An operating method according to the invention is defined by the following point 12.

12. A method for operating a driving and position-holding system as defined in one of points 1 to 8 and/or a horological calendar system as defined in point 9 and/or a movement as defined in point 10 and/or a timepiece as defined in point 11, the method comprising a step of instantaneous jump of the driving device comprising the following substeps:

a first substep of approach of the driving device;

a fourth substep of deactivation of the position-holding device by the activation and deactivation device, simultaneous with the first substep of approach of the driving device;

a second substep of driving of the driving device;

a third substep of stopping of the driving device;

a fifth substep of activation of the position-holding device by the activation and deactivation device simultaneous with the third substep of stopping of the driving device.

Different embodiments of the method are defined by the following points 13 to 15.

13. The operating method as defined in the preceding point, wherein:

the deactivated state of the position-holding device is maintained during the second substep of driving of the driving device, and the activated state of the position-holding device is maintained until a next first substep of approach of the driving device.

14. The operating method as defined in point 12 or 13, wherein the second substep of driving of the driving device is a substep of driving of at least two pitches of the mobile unit for displaying time or time derivative information.

15. The operating method as defined in one of points 12 to 14, wherein the substeps are implemented exclusively when the driving lever drives the driving cam and/or wherein the substeps are implemented instantaneously.

BRIEF DESCRIPTION OF THE DRAWINGS

The attached drawings represent, by way of examples, two embodiments of a timepiece.

DETAILED DESCRIPTION OF PARTICULAR EMBODIMENTS

Figure 1:
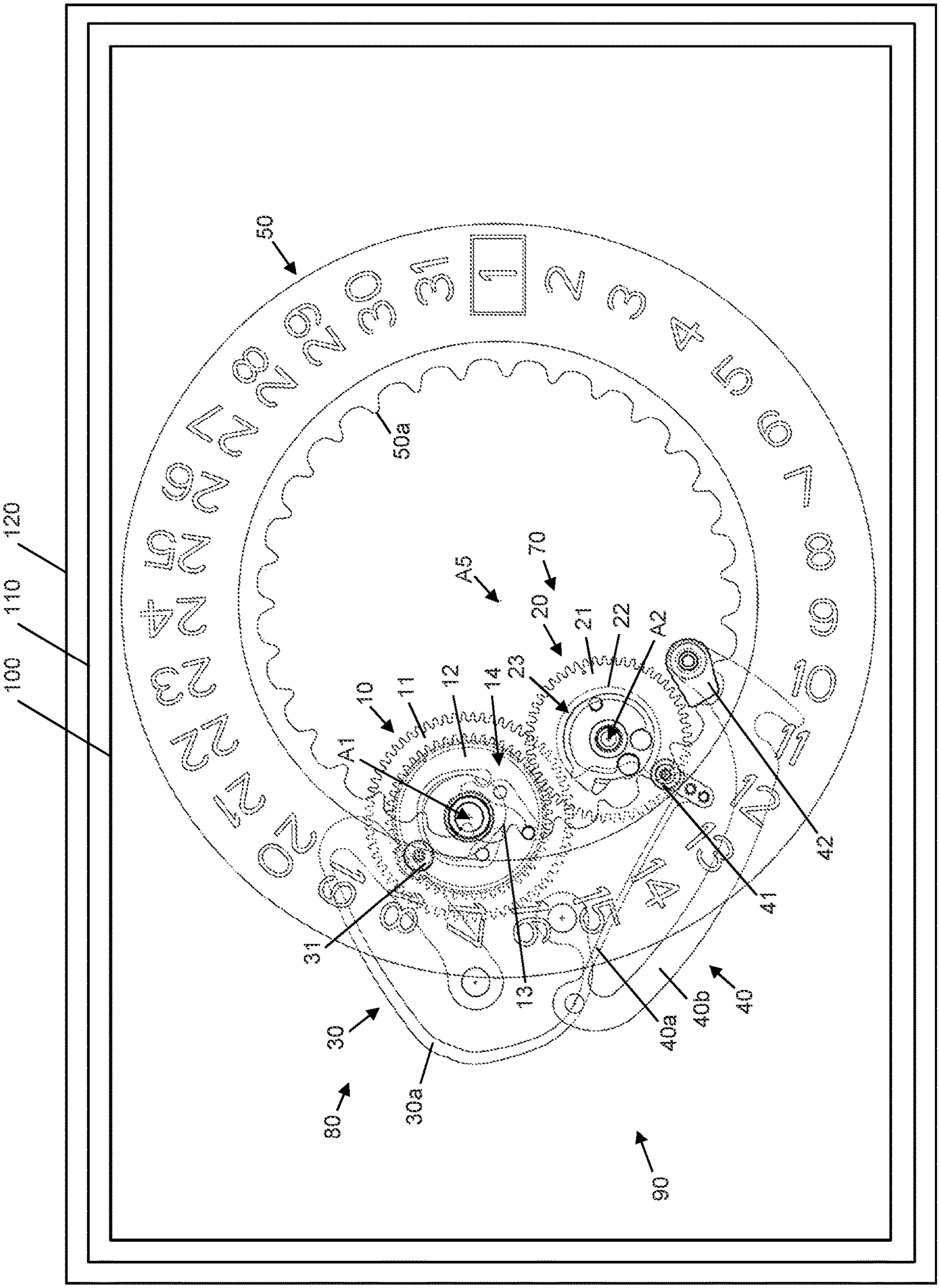
FIG. 1 is a view of a first embodiment of a timepiece.
Figure 2:
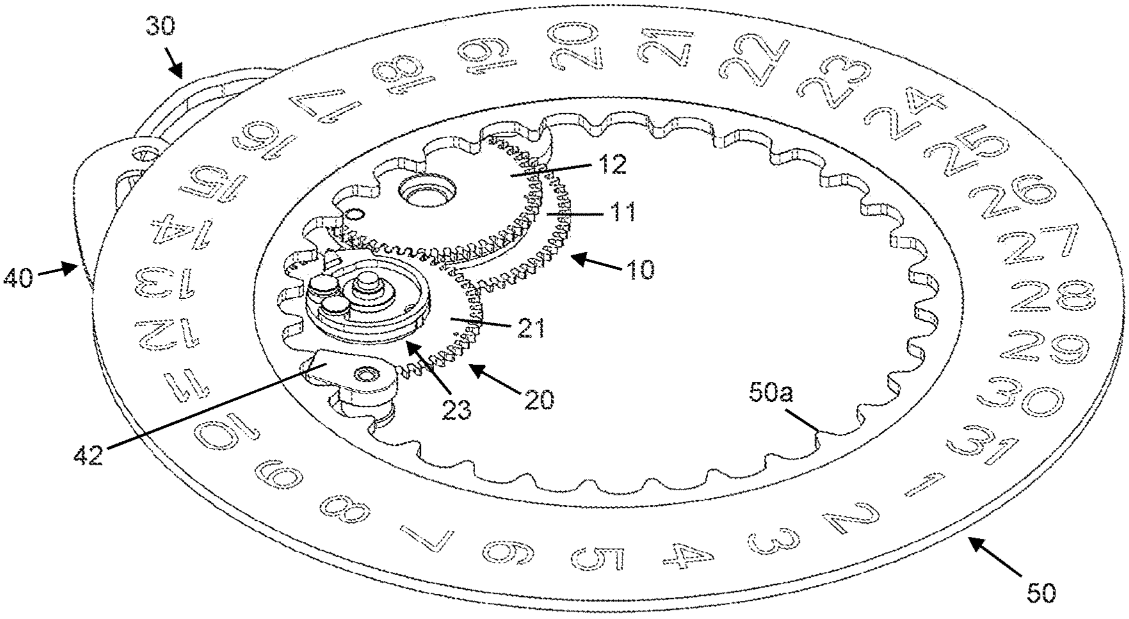
FIGS. 2 and 3 are perspective views of a calendar system of the first embodiment.

A first embodiment of a timepiece 120 is described hereinbelow with reference to FIGS. 1 to 19.

The timepiece 120 is, for example, a watch, in particular a wristwatch.

The timepiece 120 comprises a horological movement 110 intended to be mounted in a timepiece case in order to protect it from the outside environment.

The horological movement 110 can be an electronic movement or a mechanical movement, notably an automatic movement.

The horological movement 110 comprises a horological system 100, in particular a horological calendar system 100. The calendar system is, for example, a basic calendar system or an annual calendar system or a semi-perpetual calendar system or a perpetual calendar system.

The horological calendar system 100 comprises:

- a mobile unit 50 for displaying time or time derivative information, and
- a system 90 for driving and holding the mobile unit 50 in position.

The time or time derivative information display mobile unit 50 can be a time or time derivative information display mobile unit of any type. In particular, the time or time derivative information display mobile unit can be:

- a date display mobile unit, or
- a days display mobile unit, or
- a months display mobile unit, or
- a years display mobile unit, or
- an hours display mobile unit, or
- a minutes display mobile unit.

In the embodiments represented, the mobile unit is a date display mobile unit.

The system 90 for driving and holding the mobile unit 50 in position comprises:

- a device 80 for driving a mobile unit 50 comprising a driving cam 13 or instantaneous jump cam 13 and a driving lever 30 that are provided to drive a driving member 23,
- a device 40 for holding a mobile unit 50 in position,
- a device 70 for activating and deactivating the position-holding device 40 comprising a deactivation cam 22 or jumper cam 22, and
- a device 12, 21 for mechanically coupling or synchronizing the driving cam and the deactivation cam.

According to a more structural definition, the system 90 for driving and holding the mobile unit 50 in position comprises:

- an intermediate driving mobile unit 10 comprising a driving wheel 11, the driving cam 13 or instantaneous jump cam 13, a one-way connection device 14, and a first intermediate driving wheel 12,
- a driving mobile unit 20 comprising a second intermediate driving wheel 21, the deactivation cam 22 or jumper cam 22 and the driving member 23,
- an energy accumulator notably comprising a spring 30*a* secured to the driving lever 30, and a runner 31 mounted on the driving lever 30 and intended to cooperate with the instantaneous jump cam 13, and
- the device 40 for holding the mobile unit 50 in position consisting, for example, of a jumper 40 that makes it possible to index, by a beak 42, a toothing 50*a* of the mobile unit 50.

Thus, in this first embodiment, the driving device 80 comprises a driving wheel 11 and a one-way connection device 14, 15, 16, 17, 18 linking the driving wheel 11 and the driving cam 13.

The intermediate driving mobile unit 10 pivots about an axis A1.

The driving mobile unit 20 pivots about an axis A2 parallel or substantially parallel to the axis A1.

The elastic return of the driving lever 30 is ensured by the spring 30*a*. The spring 30*a* here forms part of the driving lever 30. Alternatively, they can be two distinct parts.

The mobile unit 50 can comprise a date display disk 50 pivoting about an axis A5 parallel or substantially parallel to the axis A1.

The jumper 40 can comprise:

- a jumper body 40*b* comprising an end on which the beak 42 is arranged,
- a spring 40*a*, and
- a runner 41 pivoting on one of the ends of the spring, which is intended to cooperate with the jumper cam 22.

Figure 5:
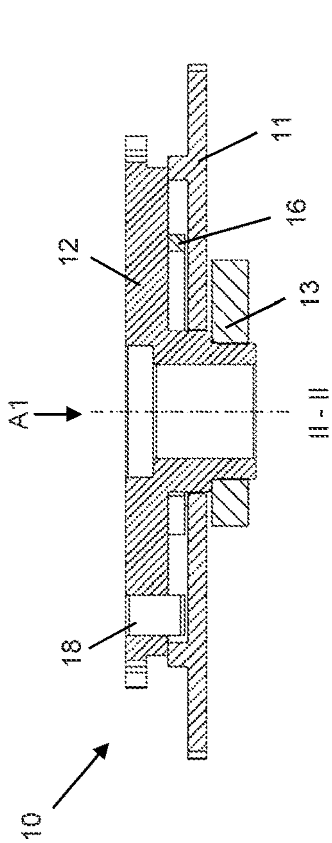
FIG. 5 is a view in a longitudinal cross-section of the intermediate driving mobile unit of the calendar system of the first embodiment.
Figure 6:
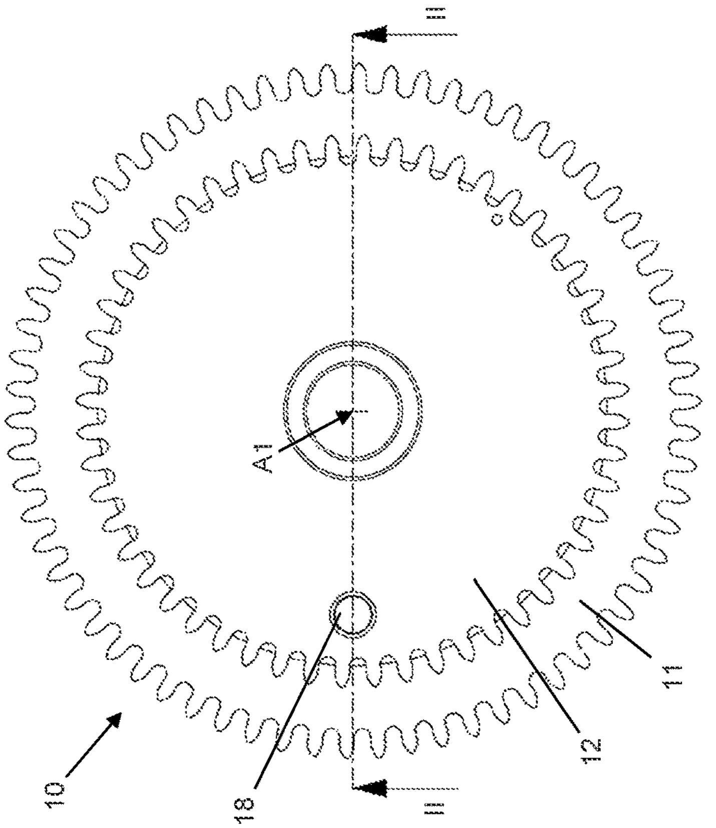
FIG. 6 is a top view of the intermediate driving mobile unit of the calendar system of the first embodiment.
Figure 4:
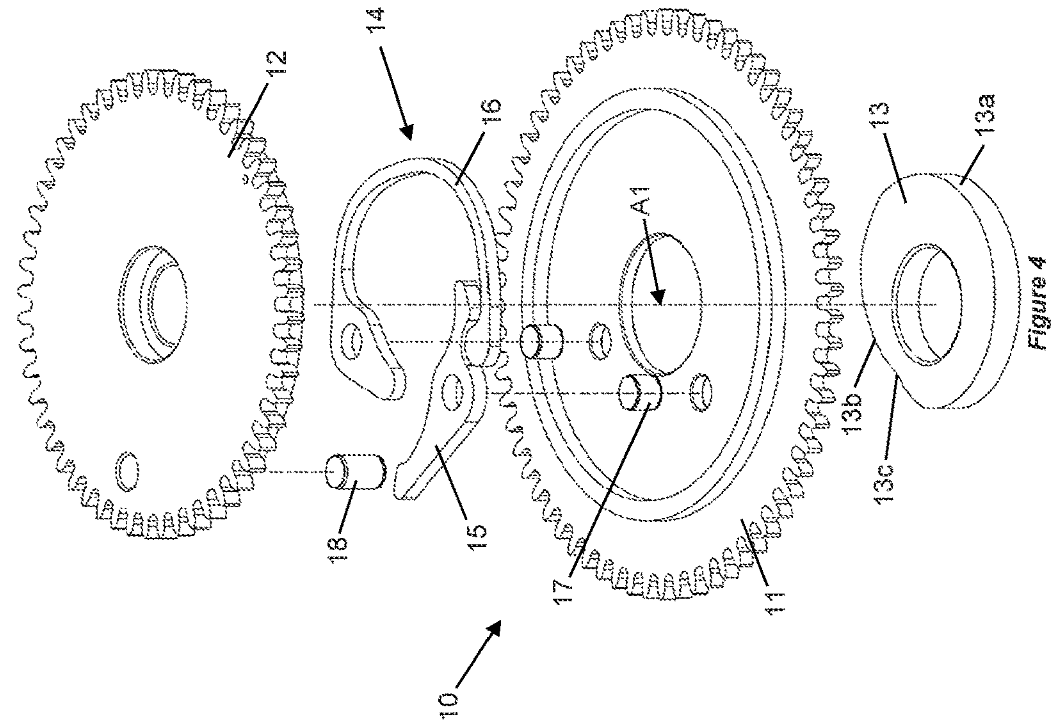
FIG. 4 is an exploded perspective view of an intermediate driving mobile unit of the calendar system of the first embodiment.

The driving wheel 11 of the intermediate driving mobile unit 10 is constantly driven by an hours wheel of the base movement, not represented in the figures, so as to perform one revolution in 24 hours. This driving wheel 11 drives the first intermediate driving wheel 12 via the one-way connection device 14. More particularly, as illustrated by FIGS. 4, 5 and 6, this one-way connection device 14 comprises a click member 15 pivoting about a pivot 17 secured to the driving wheel 11. A spring 16 tends to keep one end of the pawl member 15 to the outside of the driving wheel 11, so that it can drive, in a first direction of rotation, a stud 18 or a pin secured to the first intermediate driving wheel 12. The click member 15 is also configured so that, in a second direction of rotation, for example upon a time-setting in the anticlockwise direction, it can be retracted from the stud 18 in order not to drive the first intermediate driving wheel 12. This type of one-way connection device 14 is notably disclosed in the document EP2428855.

The first intermediate driving wheel 12 is secured to the instantaneous jump cam 13 which, associated with the driving lever 30 and with its spring 30*a*, makes it possible to accumulate daily the energy necessary for the instantaneous date transition. For example, the instantaneous jump cam 13 is fixed to or mounted via a rigid joint on the first intermediate driving wheel 12. Notably, the instantaneous jump cam 13 can be driven onto the first intermediate driving wheel 12. A runner 31 mounted to pivot on the driving lever 30 ensures the cooperation between the latter and the instantaneous jump cam 13. The runner 31 makes it possible to reduce the friction between the driving lever 30 and the instantaneous jump cam 13, which makes it possible to thus reduce the energy consumption and the amplitude losses of the regulating member of the base movement. The spring 30*a* tends to hold this runner 31 against the instantaneous jump cam 13. The driving lever 30 comprises two ends that are each intended to be linked with a pivot link to a frame of the movement and is configured so as to be able to accumulate energy in the elastic part of the spring 30*a*. This lever configuration advantageously makes it possible to limit the mechanical stresses when the elastic part of the spring is armed while being able to be housed within a given footprint. Such a spring 30*a* arrangement is notably disclosed in the document WO2013102600.

The first intermediate driving wheel 12 drives, by its toothing, the second intermediate driving wheel 21 of the driving mobile unit 20. The second intermediate driving wheel 21 is secured to the jumper cam 22 and supports the driving member 23.

Figure 8:
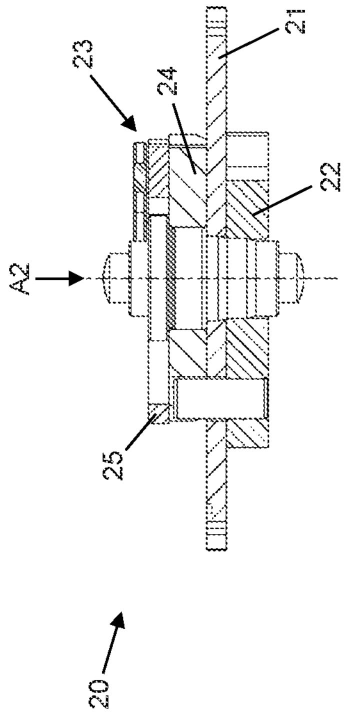
FIG. 8 is a view in longitudinal cross-section of the driving mobile unit of the calendar system of the first embodiment.
Figure 9:
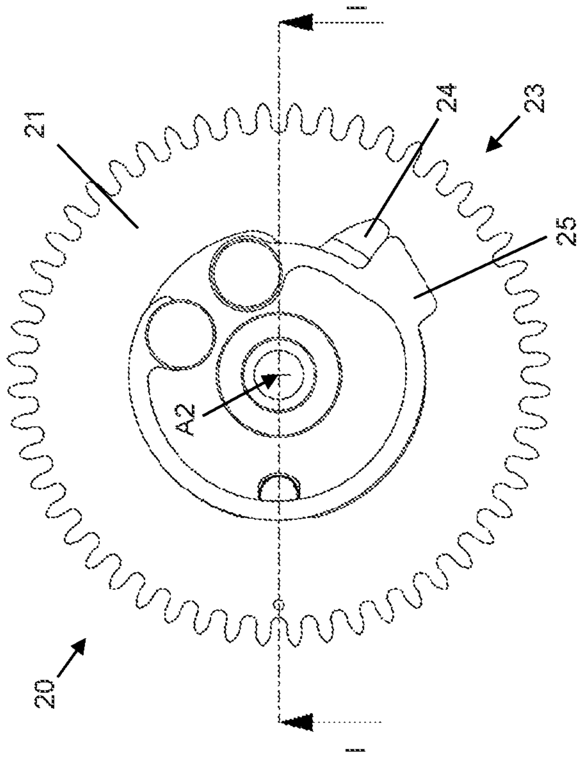
FIG. 9 is a top view of the driving mobile unit of the calendar system of the first embodiment.
Figure 7:
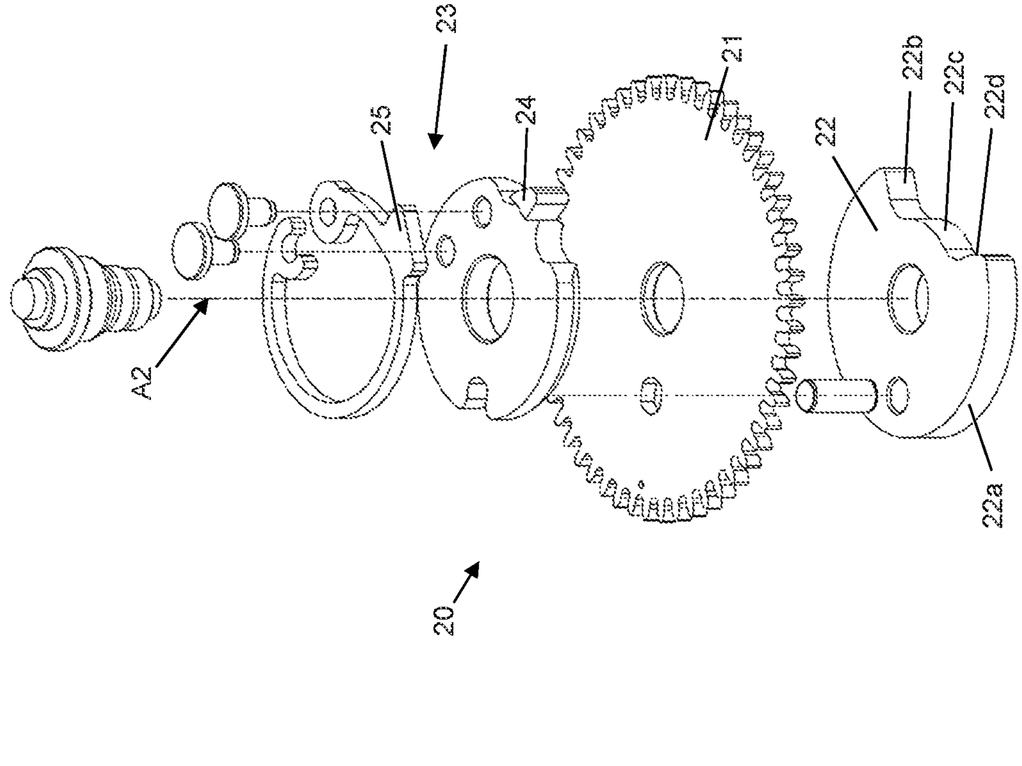
FIG. 7 is an exploded perspective view of a driving mobile unit of the calendar system of the first embodiment.

As illustrated in FIGS. 7, 8 and 9, the driving member 23 comprises a first member 24, such as a rigid finger, and a second elastic member 25, such as a finger mounted on an elastic support or elastic finger, that are intended to cooperate with the toothing 50*a* of the mobile unit 50.

The position-holding device 40 makes it possible to index the toothing 50*a* via the beak 42. The spring 40*a* is arranged so as to return the beak 42 into the toothing 50*a*. The respective configurations of the beak 42 and of the toothing 50*a*, and the arming level of the spring 40*a*, define a determined torque about the axis A5 of the mobile unit or disk 50. This torque is determined so as to hold the disk 50 in position, in particular upon an impact of predefined intensity. Obviously, the higher the arming of the spring 40*a*, and this independently of the respective configurations of the beak 42 and of the toothing 50*a*, the greater this torque will be, which directly impacts the energy consumption of the movement and thus the chronometric performance of said movement.

Advantageously, the arming level of the spring 40*a* is, here, controlled by the activation and deactivation device 70 of the position-holding device 40. In concrete terms, the cooperation of the runner 41 with the profile of the jumper cam 22 makes it possible to modulate the arming of the spring 40*a* as a function notably of the geometry and of the angular position of the outer profile of this jumper cam 22. Advantageously, the angular position thereof is linked to the angular position of the instantaneous jump cam 13, via the mechanical coupling device 12, 21. Thus, with such a system for driving and holding the mobile unit 50 in position, the arming level of the spring 40*a*, and by extension the torque that it produces, can be controlled or modulated in synchronism with the driving of the mobile unit 50.

Figure 3:
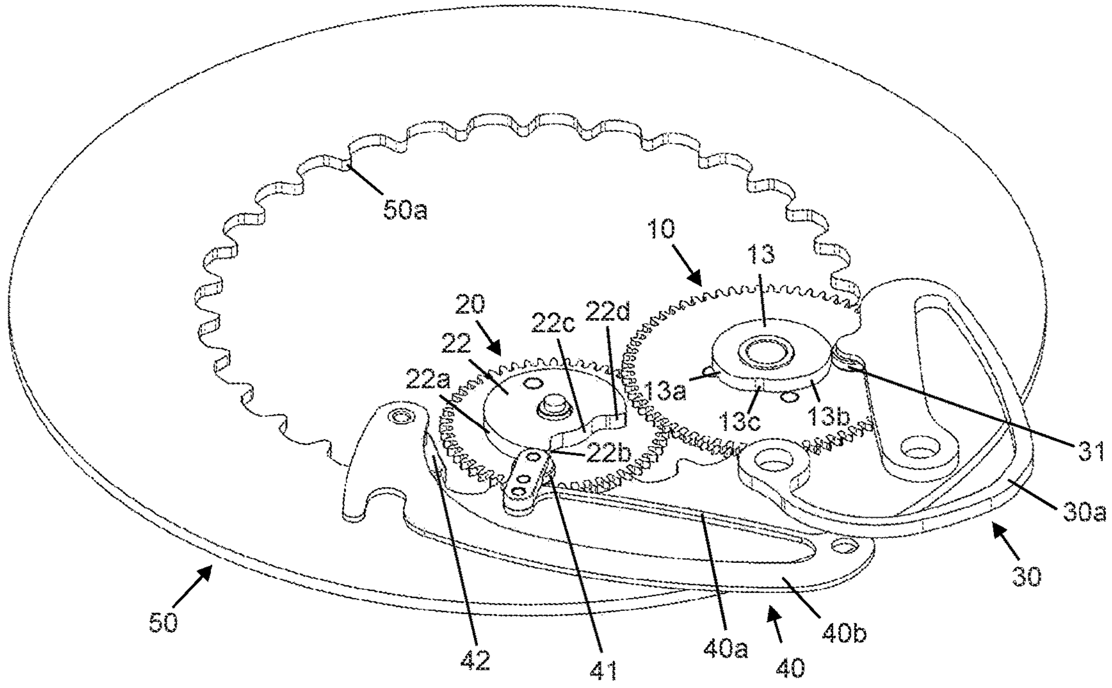
Figure 11:
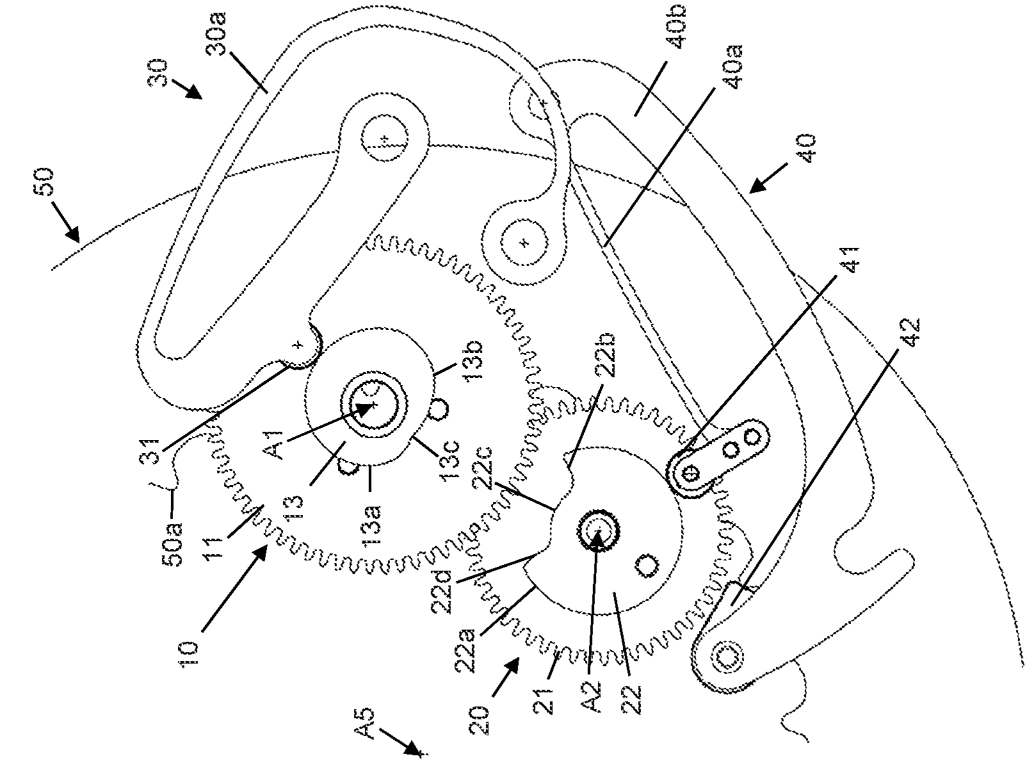
FIGS. 10 to 19 are partial and illustrative views of the operation of the calendar system of the first embodiment.
Figure 10:
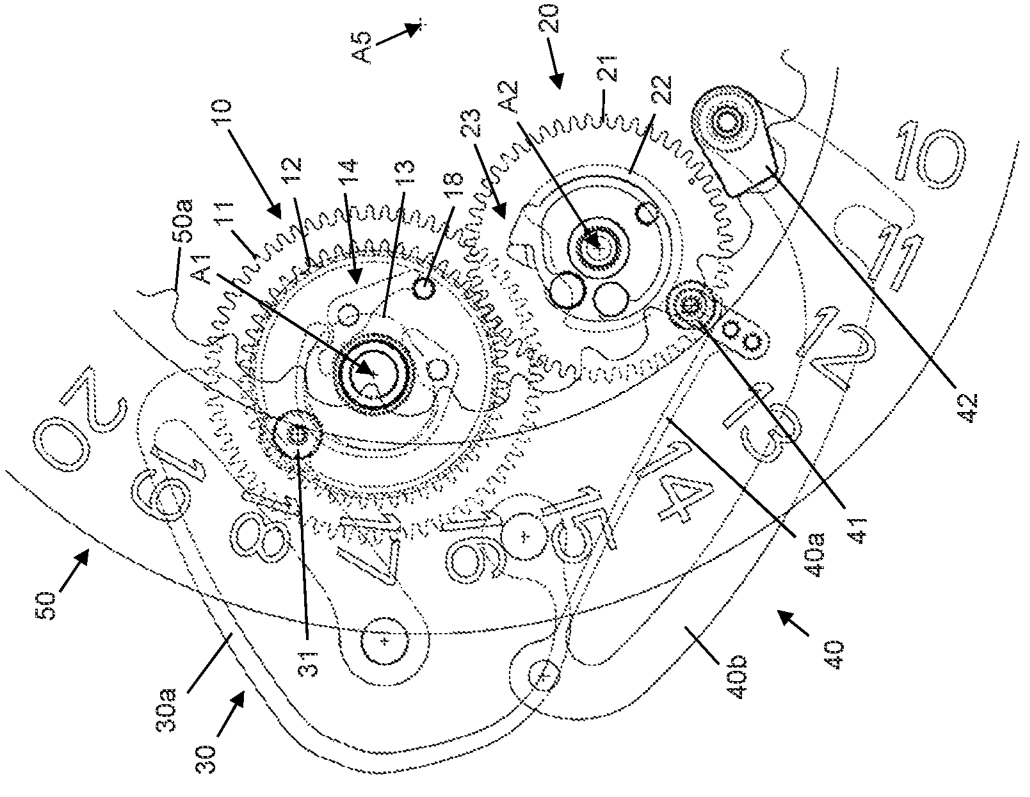
Figure 13:
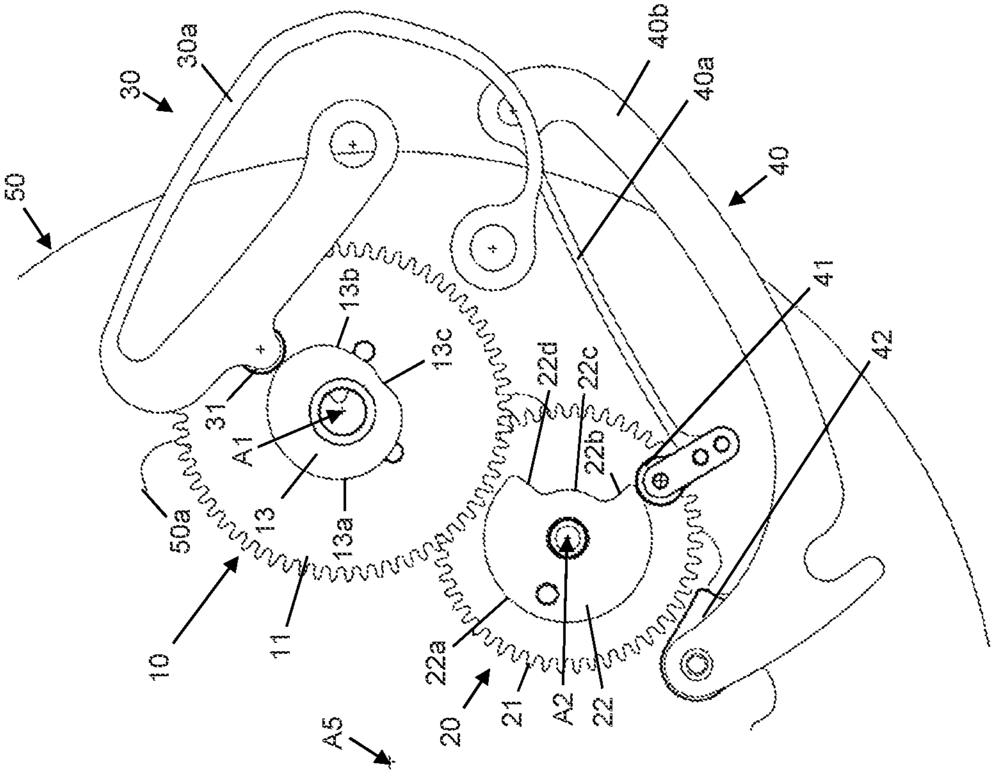
Figure 12:
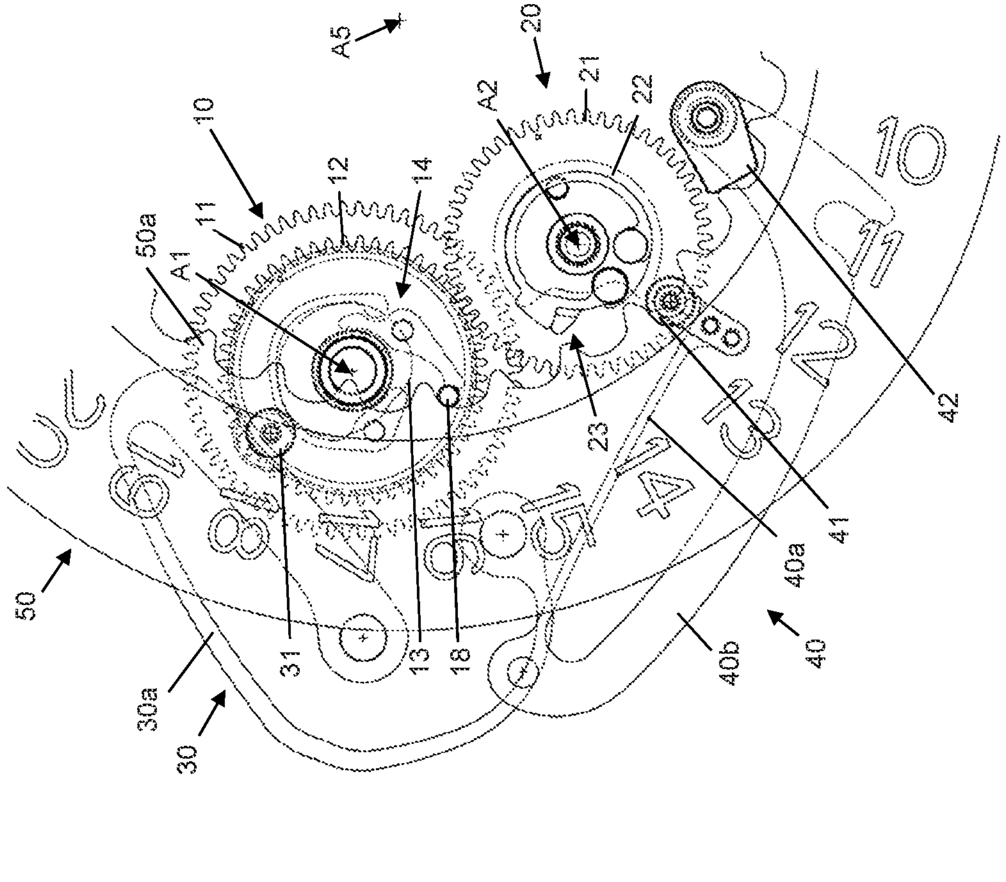

The instantaneous jump cam 13 comprises an arming profile 13*a*, an instantaneous jump profile 13*b*, and a stop profile 13*c* that are intended to cooperate successively with the runner 31 of the driving lever 30, as illustrated in FIG. 3. In an arming step, as illustrated in FIGS. 10 and 11, the runner 31 is located on the arming profile 13*a*. This profile makes it possible to arm the spring 30*a* so as to accumulate the energy necessary for an instantaneous driving of the mobile unit 50, for example upon a date transition. To recap, the instantaneous jump cam 13 is linked to the first intermediate driving wheel 12 comprising the stud 18, this assembly being driven, during the arming step, by the driving wheel 11 via the one-way connection device 14. The energy necessary for the arming of the spring 30*a* is thus directly taken from the base movement. Advantageously, the arrangement of such an energy accumulation device associated with the configuration of the arming profile 13*a* of the instantaneous jump cam 13 make it possible to minimize and match the energy consumption of the base movement so as to generate the same, or substantially the same, loss of amplitude on the regulating member throughout this arming step, or at least during most of this arming step. The arrangement of the instantaneous jump cam 13 notably makes it possible to arm the spring 30*a* as soon as the latter is once again driven after the date transition. That makes it possible to spread the energy consumption over a maximized time band and minimize as much as possible the amplitude losses on the regulating member.

As mentioned previously, the jumper cam 22 is kinematically linked to the instantaneous jump cam 13 via first and second intermediate driving wheels 12, 21. This jumper cam 22 comprises an outer profile 22*a*, a disarming profile 22*b*, an inner profile 22*c* and an arming profile 22*d* that are intended to cooperate successively with the runner 41 arranged at one of the ends of the spring 40*a* of the jumper 40. As for the runner 31 cooperating with the instantaneous jump cam 13, the runner 41 makes it possible to reduce the friction on contact with the jumper cam 22. Throughout the arming step in which the instantaneous jump cam 13 is driven by the driving wheel 11 and in which the runner 31 of the driving lever 30 is on the arming profile 13*a* of the instantaneous jump cam 13, the runner 41 of the jumper 40 is located exclusively on the outer profile 22*a*. This outer profile 22*a* is concentric to the axis A2 and is configured so as to keep the spring 40*a* armed in order to offer a nominal torque for indexing or holding the mobile unit 50 in position.

The arming step ends when the runner 31 arrives at the end of the arming profile 13*a* which is adjacent to the instantaneous jump profile 13*b*. This end is called "cam summit". Thus, the instant at which the runner arrives at the "cam summit" marks the stopping of the arming step and the beginning of the instantaneous jump step. It is thus an instant of transition between the arming and instantaneous jump steps.

During this instantaneous jump step, all of the energy necessary for the date transition, stored up by the spring 30*a* of the energy accumulation device, is restored for the instantaneous driving of the mobile unit 50. In other words, in the instantaneous jump step, the instantaneous jump cam 13 becomes a driver through the restoration of the energy accumulated by the spring 30*a*. More particularly, in the instantaneous jump step, the driving cam 13 is driven by the driving lever 30 under the effect of the spring 30*a*. The driving cam 13 then drives the first and second intermediate driving wheels 12, 21, then the driving member 23 which, in turn, drives the toothing 50*a* for the date transition. In the instantaneous jump step, the one-way connection device 14 makes it possible to decouple from the base movement all of the downstream chain of said device in order for the instantaneous jump cam 13 to be able to be a driver. The angular travel then performed by the driving member 23 has an angle defined by the geometry of the instantaneous jump cam 13 and corresponds to the lead necessary for the driving of the toothing 50*a*.

During this instantaneous jump step, the jumper 40 is disarmed just before the driving of the mobile unit 50 and is immediately rearmed before the end of this step, which makes it possible to reduce the energy consumption necessary for the date transition, without compromising the indexing of the mobile unit 50.

More particularly, the instantaneous jump step comprises several successive substeps or steps which are detailed hereinbelow.

Figure 15:
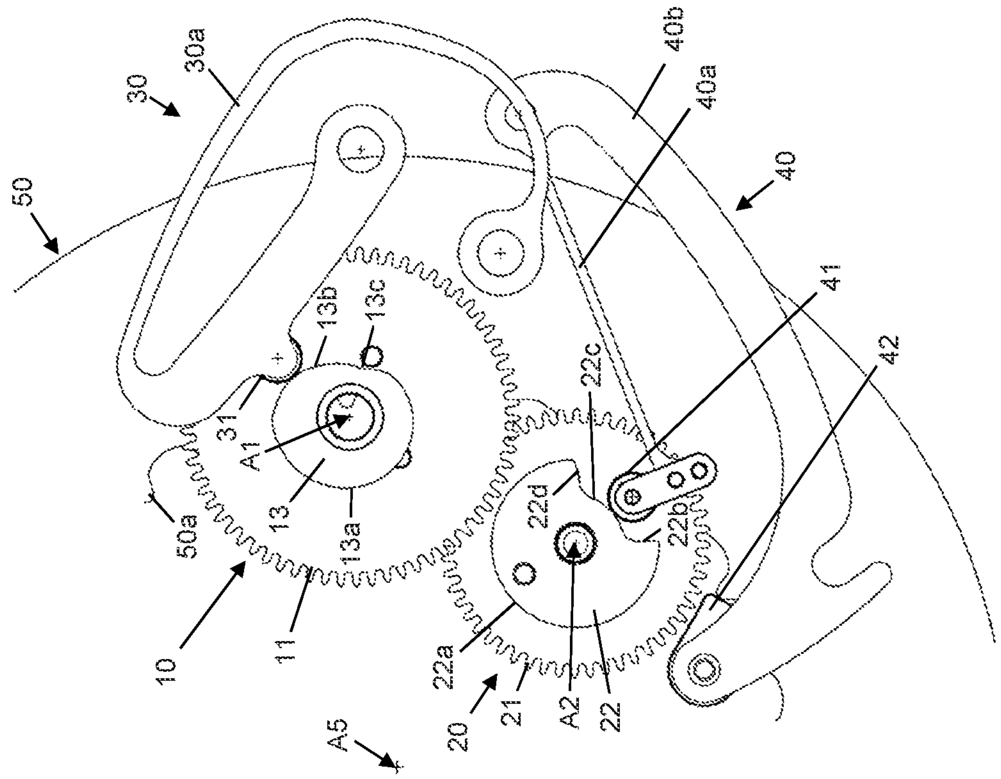
Figure 14:
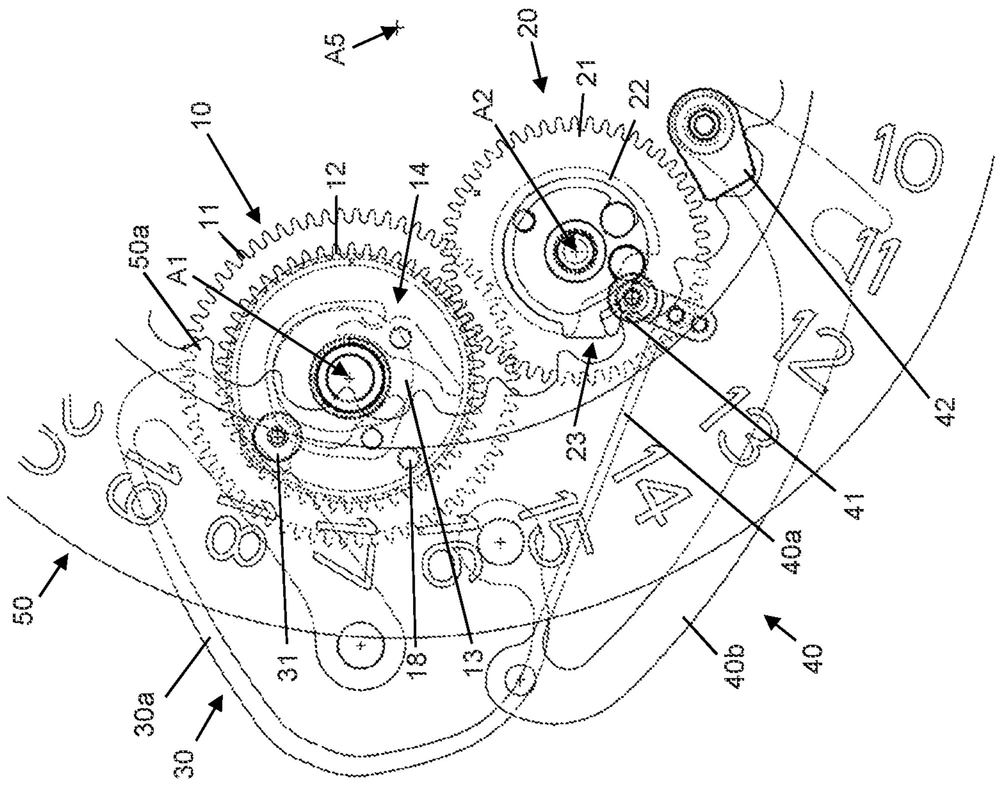

The instantaneous jump step comprises, first of all, a first substep of approach in which the runner 31 begins to travel on the instantaneous jump profile 13*b* of the instantaneous jump cam 13 from the "cam summit". During this first approach substep, the driving member 23 is not yet in contact with the toothing 50*a* of the mobile unit 50. The mobile unit 50 is thus not yet driven. During this first approach substep, the jumper 40 is disarmed in order to reduce the torque that it produces and, consequently, the energy necessary for the driving of the mobile unit 50 during a second driving substep which will be described later. During this first approach substep, the runner 41 thus travels along the disarming profile 22*b* to arrive at the inner profile 22*c* of the jumper cam 22. This inner profile 22*c* corresponds to the minimum arming level of the jumper 40. This minimum arming level makes it possible to define a reduced torque for indexing or holding the mobile unit in position that is particularly advantageous for the second driving substep. The end of the first approach substep is illustrated in FIGS. 14 and 15, and coincides with the instant at which the driving member 23 enters into contact with the toothing 50*a* of the mobile unit 50.

Figure 17:
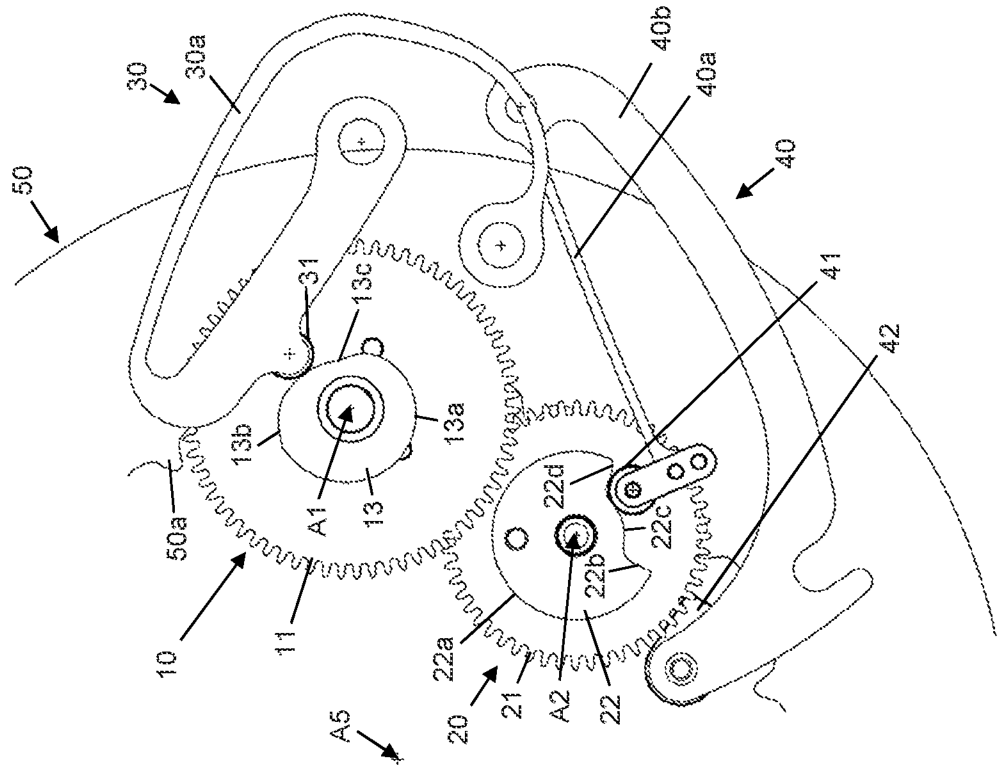
Figure 16:
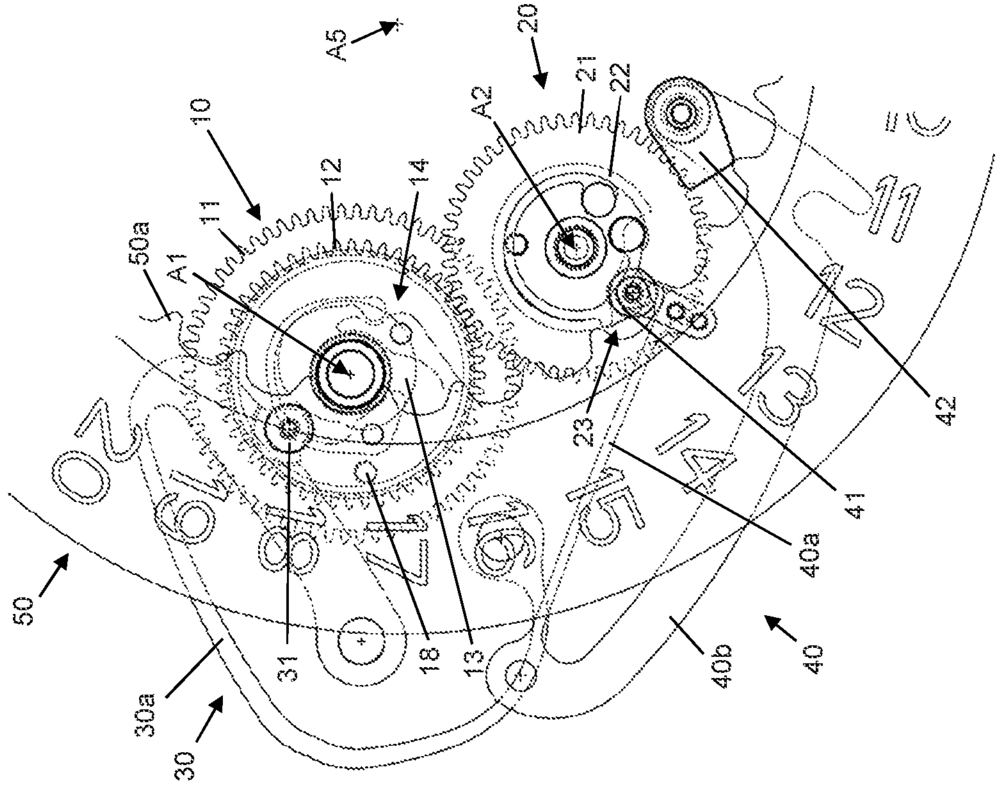

In a second driving substep, the driving member 23 drives the toothing 50*a*. The driving is done in optimal conditions in energy terms because the jumper 40 has been previously disarmed in the first approach substep. Preferentially, the jumper is disarmed until the instant when the beak 42 of the jumper 40 has arrived or substantially arrived at the summit of the toothing 50*a*. This configuration is illustrated in FIGS. 16 and 17. Here, the runner 41 is in contact with the inner profile 22*c*, a configuration in which the arming level of the jumper 40 is the lowest.

Figure 19:
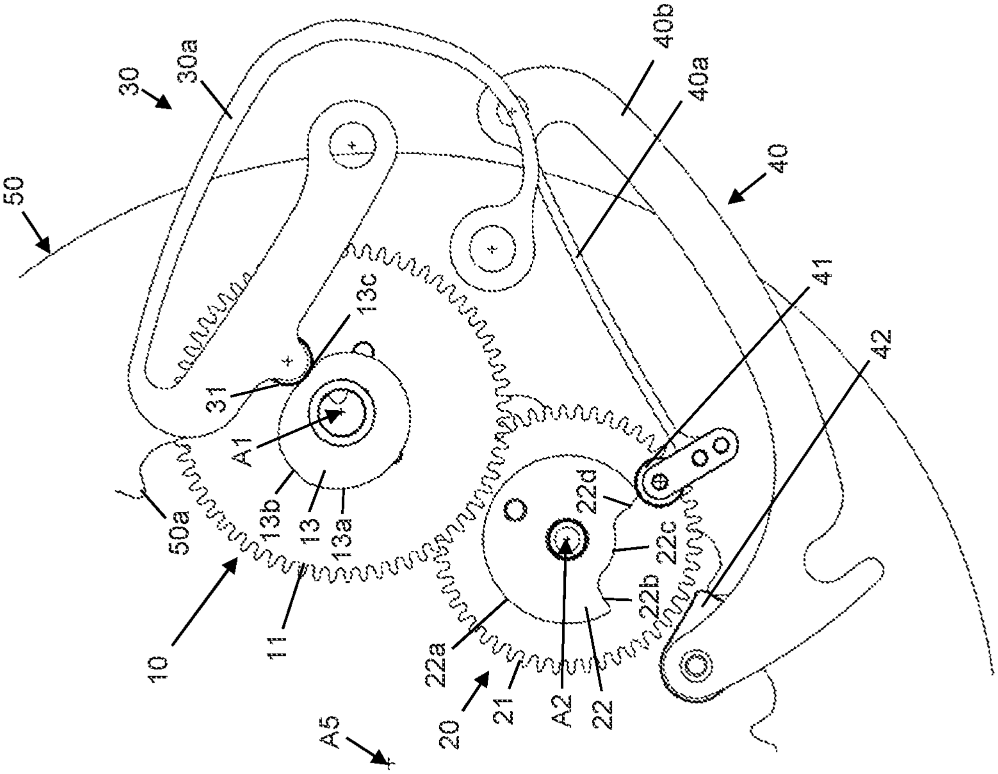
Figure 18:
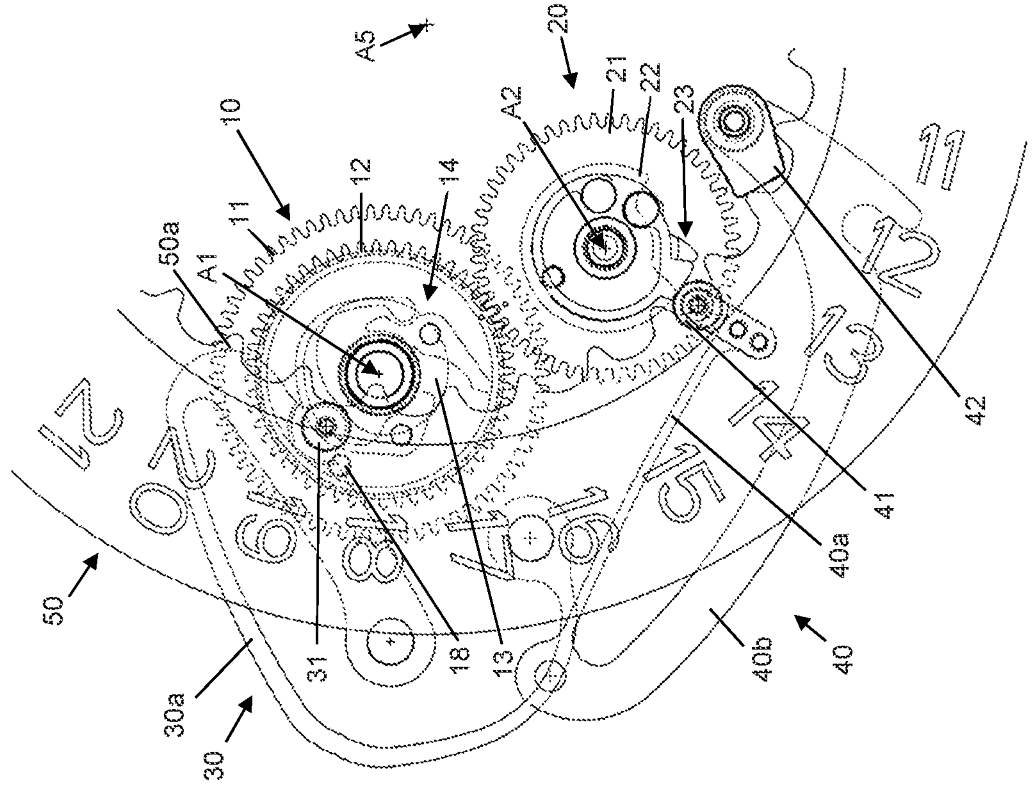
Figure 20:
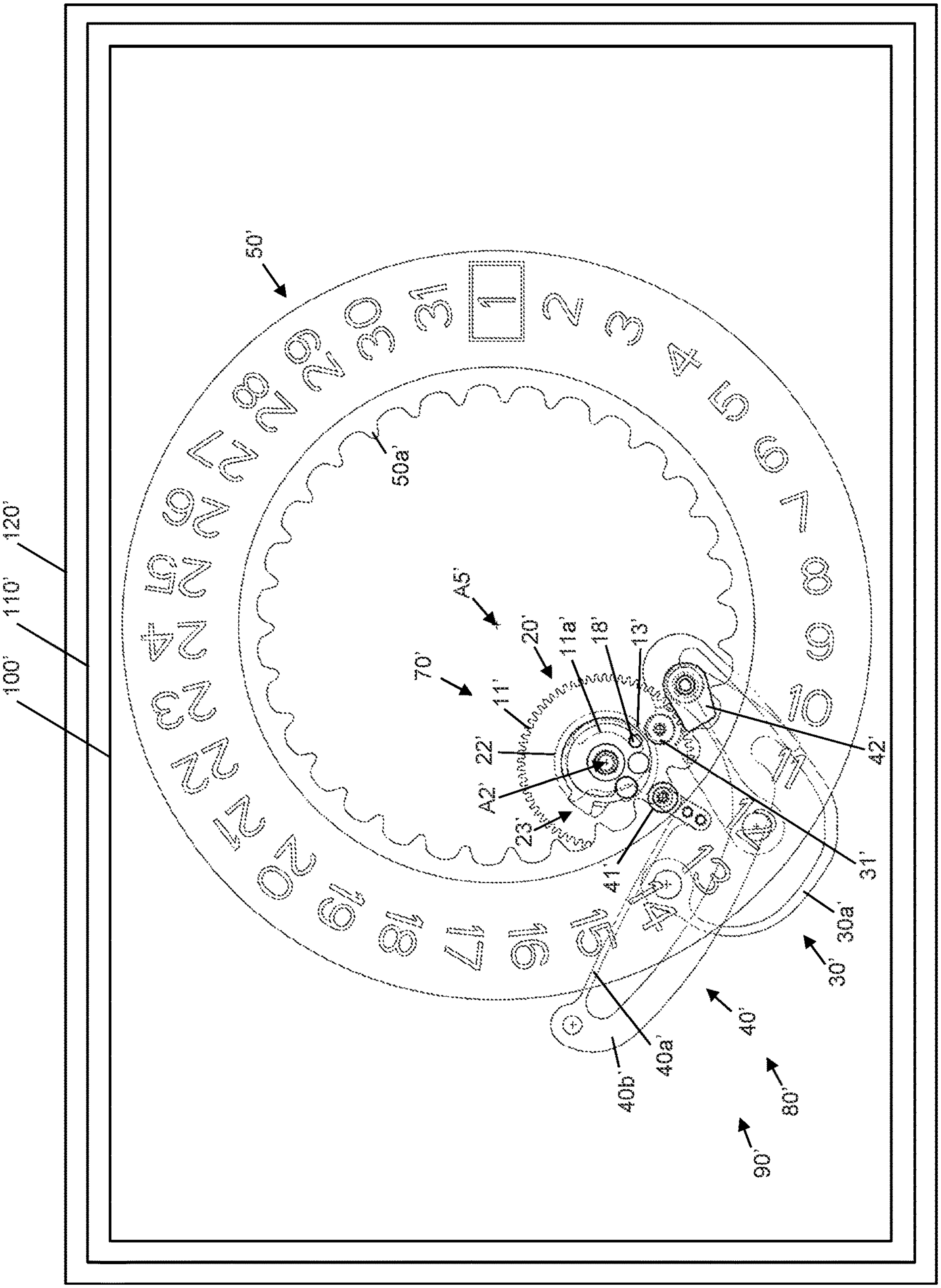
FIG. 20 is a view of a second embodiment of a timepiece.
Figure 21:
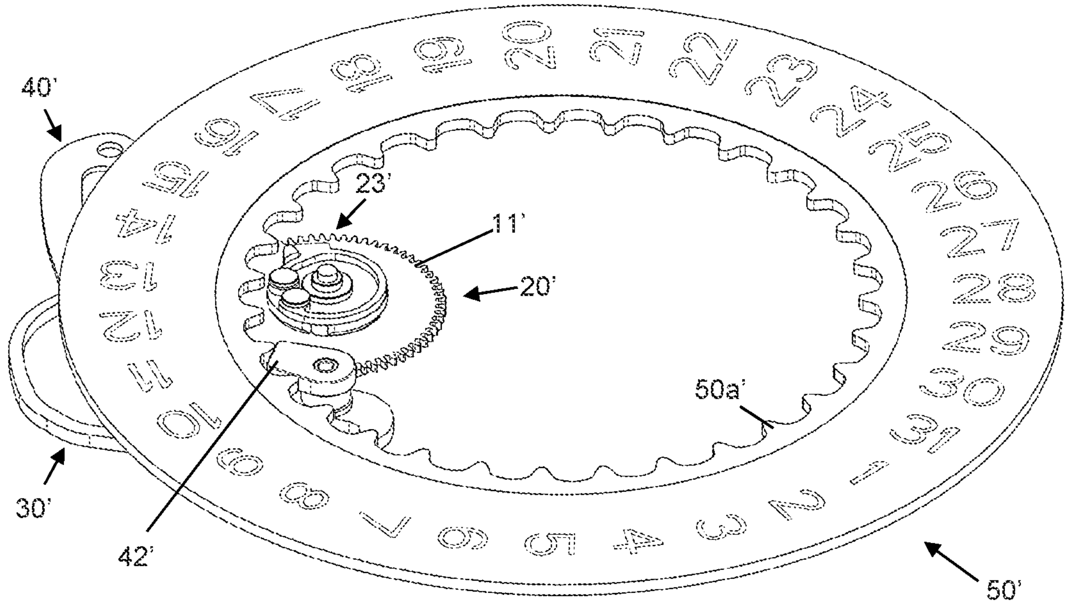
FIGS. 21 and 22 are perspective views of a calendar system of the second embodiment.
Figure 22:
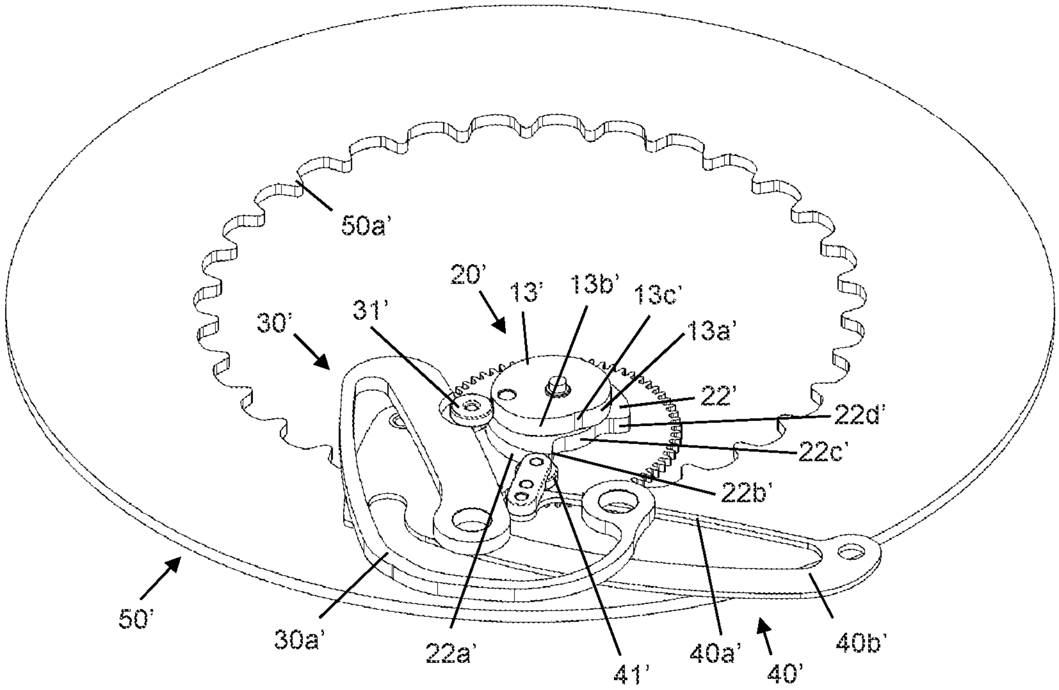
Figure 24:
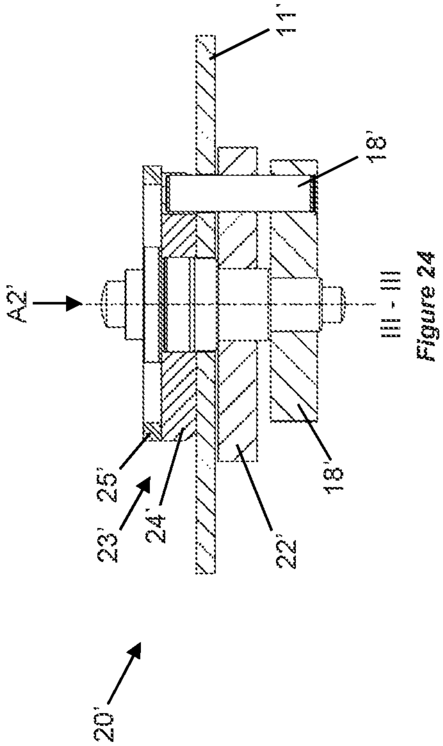
FIG. 24 is a view in longitudinal cross-section of the driving mobile unit of the calendar system of the second embodiment.
Figure 25:
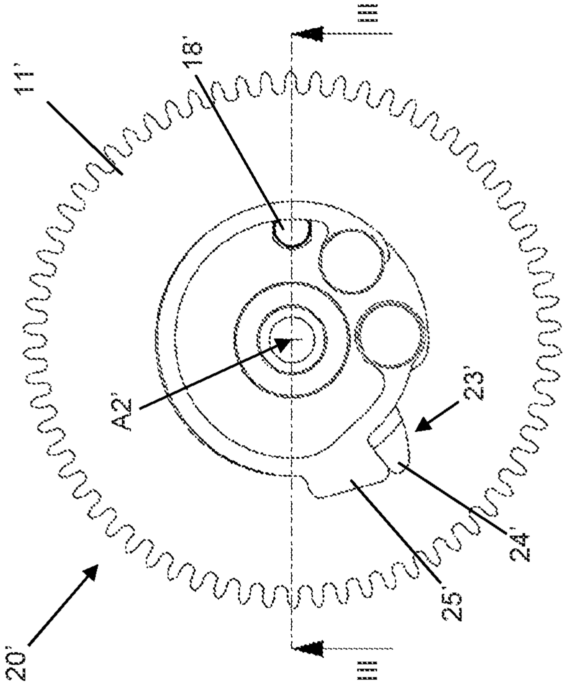
FIG. 25 is a top view of the driving mobile unit of the calendar system of the second embodiment.
Figure 23:
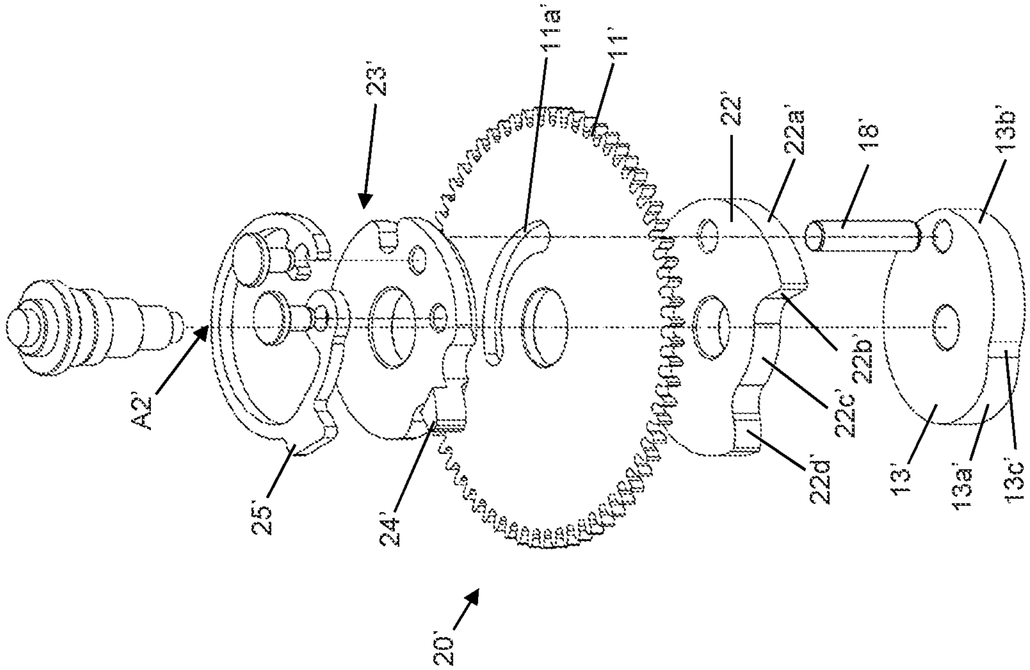
FIG. 23 is an exploded perspective view of a driving mobile unit of the calendar system of the second embodiment.

A third, stopping substep consists in completing the lead of the toothing 50*a* and in stopping the mobile unit 50. In this third, stopping substep, the beak 42 descends along the toothing 50*a*, under the effect of the restoration of the deformation energy of the spring 40*a* so as to contribute to the driving of the mobile unit 50 to its final position. This thus minimizes the energy required for the driving thereof. In this third, stopping substep, in which the energy required for the driving of the disk is less, the jumper 40 is rearmed. To do this, the runner 41 travels along the arming profile 22*d* of the jumper cam 22 to arrive on the outer profile 22*a*, thus defining a configuration in which the spring 40*a* is fully armed, as is illustrated in FIGS. 18 and 19.

The third, stopping substep ends when the runner 31 enters into contact with the stop profile 13*c*. Preferentially, at this instant, the driving member 23 is still positioned in the path of the toothing 50*a*. The driving member 23 thus serves as end-of-travel abutment of the mobile unit 50 in order to avoid the latter from being able to possibly make an unwanted jump because of its inertia and the considerable energy which is released in the instantaneous jump step. Because of this, the positioning torque of the driving mobile unit 20 induced by the stop profile 13*c* must be sufficiently great to retain the mobile unit 50 at the end of the date transition.

Thus, at the end of the instantaneous jump step, in particular at the end of the third, stopping substep, when the runner 31 is located on the stop profile 13*c*, the driving member 23 is still positioned in the path of the toothing 50*a*.

To sum up, each period of 24 hours comprises an arming step and an instantaneous jump step. The instantaneous jump step is itself composed of a first, approach substep, followed by a second, driving substep which is itself followed by a third, stopping substep. In other words, the instantaneous jump step corresponds to the succession of said first, second and third substeps.

As described previously, the chain downstream of the one-way connection device 14 is decoupled from the driving wheel 11 during the instantaneous jump step. The result thereof is that, after the date transition, the driving wheel 11 with its one-way connection device 14 catches the stud 18, secured to the first intermediate driving wheel 12 and the instantaneous jump cam 13, to be able to begin to rearm the energy accumulation device and thus begin a new arming step. This catching will last for the time it takes for the one-way connection device 14 to travel the angular extent defined by the geometry of the instantaneous jump cam 13, which is configured so as to allow a suitable lead of the mobile unit 50.

The arming step extends here over a duration significantly greater than that corresponding to the instantaneous jump step, the arming step extending over a duration of one or more hours while the instantaneous jump step, in particular all the substeps of which it is composed, extends over a duration of the order of a few fractions of a second.

As described previously, the position-holding device 40 can thus be actuated according to different substeps by the activation and deactivation device 70. A fourth substep of deactivation of the position-holding device 40 by the activation and deactivation device 70 is applied during the instantaneous jump step of the driving device 80, more particularly during the first, approach substep of the driving device 80. A fifth substep of activation of the position-holding device 40 by the activation and deactivation device 70 is also applied during the instantaneous jump step of the driving device 80, more particularly during the third substep of stopping of the driving device 80.

The driving and position-holding system 90 thus allows the following operating steps:

- a step of arming of the driving device 80;
- a step of instantaneous jump of the driving device 80, which breaks down according to the following different substeps:
  - a first, approach substep;
  - a second, driving substep;
  - a third, stopping substep;
  - a fourth substep of deactivation of the position-holding device 40 by the activation and deactivation device 70;
  - a fifth substep of activation of the position-holding device 40 by the activation and deactivation device 70.

A second embodiment of a timepiece 120' is described hereinbelow with reference to FIGS. 20 to 27.

The timepiece 120' is, for example, a watch, in particular a wristwatch.

The timepiece 120' comprises a horological movement 110' intended to be mounted in a timepiece case in order to protect it from the outside environment.

The horological movement 110' can be an electronic movement or a mechanical movement, notably an automatic movement.

The horological movement 110' comprises a horological system 100', in particular a horological calendar system 100'. The calendar system is, for example, a basic date system or an annular calendar system or a semi-perpetual calendar system or a perpetual calendar system.

The horological calendar system 100' comprises:

- a mobile unit 50' for displaying time or time derivative information, and
- a system 90' for driving and holding the mobile unit 50' in position.

The time or time derivative information display mobile unit 50' can be a time or time derivative information display mobile unit of any type. In particular, the time or time derivative information display mobile unit can be:

- a date display mobile unit, or
- a days display mobile unit, or
- a months display mobile unit, or
- a years display mobile unit, or
- an hours display mobile unit, or
- a minutes display mobile unit.

In the embodiments represented, the mobile unit is a date display mobile unit.

The system 90' for driving and holding the mobile unit 50' in position also comprises:

- a device 80' for driving a mobile unit 50' comprising a driving cam 13' or instantaneous jump cam 13' and a driving lever 30 provided to drive a driving member 23',
- a device 40' for holding a mobile unit 50' in position,
- a device 70' for activating and deactivating the position-holding device 40' comprising a deactivation cam 22' or jumper cam 22', and
- a device 18' for mechanically coupling or synchronizing the driving cam and the deactivation cam.

This second embodiment differs primarily or exclusively from the first embodiment in that:

- the activation and deactivation device 70', in particular the jumper cam 22', and
- the instantaneous jump cam 13', are coaxial.

More particularly, compared to the first embodiment, the second embodiment does not comprise an intermediate driving mobile unit 10 but a single driving mobile unit 20' in which the jumper cam 22' and the instantaneous jump cam 13' are directly integral, without being linked by first and second intermediate driving wheels 12, 21.

Preferably, apart from these few modifications, all the rest of the system according to the second embodiment operates in the same way as the first embodiment, whether it be at the energy accumulation, or mobile unit driving and indexing level.

According to a more structural definition, the system 90' for driving and holding the mobile unit 50' in position comprises:

- a driving mobile unit 20' comprising a driving wheel 11' provided with an oblong cutout **11*a*', the instantaneous jump cam 13', the jumper cam 22' and the driving member 23'**,
- an energy accumulator comprising notably a spring **30*a*' secured to the driving lever 30', and a runner 31' mounted on the driving lever 30' and intended to cooperate with the instantaneous jump cam 13'**,
- the device 40' for holding the mobile unit 50' in position consisting, for example, of a jumper 40' that makes it possible to index, by a beak 42', a toothing **50*a*' of the mobile unit 50'**.

Thus, in this second embodiment, the driving device 80' can comprise a driving wheel 11' and a mechanical connection **11*a*', 18' linking the driving wheel 11' and the driving cam 13'. Advantageously, the mechanical connection 11*a*', 18' allows a play in rotation, according to an angular range corresponding to the angular extent of the oblong cutout 11*a*', about an axis A2' of rotation of the driving wheel 11' and/or of the driving cam 13'**.

The elastic return of the driving lever 30' is ensured by the spring **30*a*'. The spring 30*a*' here forms part of the driving lever 30'**. Alternatively, they can be two distinct parts.

The mobile unit 50' can comprise a date display disk 50' pivoting about an axis A5' parallel or substantially parallel to the axis A2'.

The jumper 40' can comprise:

- a jumper body **40*b*' comprising an end on which the beak 42'** is arranged,
- a spring **40*a*'**, and
- a runner 41' pivoting on one of the ends of the spring, which is intended to cooperate with the jumper cam 22'.

The driving wheel 11' of the driving mobile unit 20' is constantly driven by an hours wheel of the base movement, not represented in the figures, so as to perform one revolution in 24 hours. This driving wheel 11' does not, however, comprise a one-way connection device as on the intermediate driving mobile unit 10 of the first embodiment. Nevertheless, the chain positioned downstream of the driving wheel 11' even so has a degree of freedom in rotation relative to said wheel 11' by virtue of the arrangement of the oblong cutout **11*a*' intended to cooperate with a stud 18' secured to the jumper cam 22', the instantaneous jump cam 13' and the driving member 23'. The oblong cutout 11*a*' follows a portion of a circle coaxial to the axis A2' and allows the stud 18', and the components which are secured to it, to travel at least an angular extent defined by the geometry of the instantaneous jump cam 13'. This angular extent is defined so as to allow a suitable lead of the driving member 23' for the date transition. This degree of freedom therefore allows the driving member 23' to be decoupled from the driving wheel 11'** and from the base movement in the instantaneous jump step.

As in the first embodiment, the driving lever 30' and the jumper 40' therefore cooperate respectively with the instantaneous jump cam 13' and the jumper cam 22' via their runner, respectively 31' and 41'. As illustrated in detail in FIGS. 23, 24 and 25, the instantaneous jump cam 13' and the jumper cam 22' respectively comprise the same profiles as those of the first embodiment, namely an outer profile **22*a*', a disarming profile 22*b*', an inner profile 22*c*', and an arming profile 22*d*' for the jumper cam body 22', as well as an arming profile 13*a*', an instantaneous jump profile 13*b*', and a stop profile 13*c*' for the instantaneous jump cam 13'. The driving member 23' operates in the same way and comprises the same components as that of the first embodiment. More particularly, it comprises a first member 24', such as a rigid finger, and a second, elastic member 25' for driving the toothing 50*a*'**.

In the arming step, the driving wheel 11' drives, via the cooperation of the oblong cutout **11*a*' and of the stud 18', the jumper cam 22', the instantaneous jump cam 13' and the driving member 23'. As for the first embodiment, the runner 31' of the driving lever 30' is located, during this arming step, on the arming profile 13*a*' of the instantaneous jump cam 13', and the runner 41' of the jumper 40' is located on the outer profile 22*a*' of the jumper cam 22'. The jumper 40'** is therefore armed optimally throughout this arming step.

Figure 26:
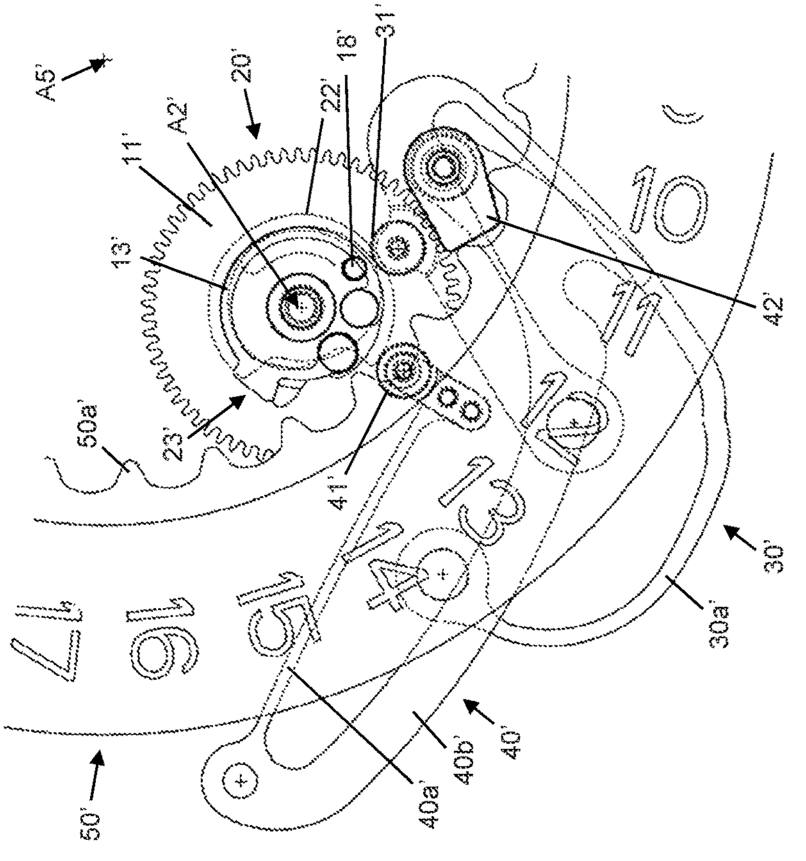
FIGS. 26 and 27 are partial and illustrative views of the operation of the calendar system of the second embodiment.
Figure 27:
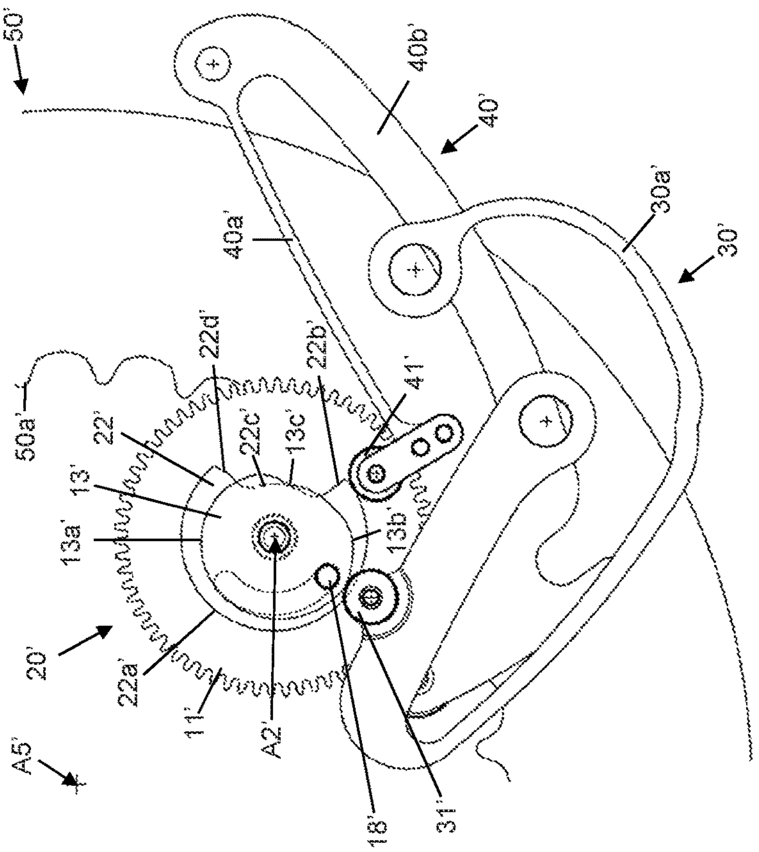

As for the first embodiment, the arming step ends when the runner 31' arrives at the end of the arming profile **13*a*' which is adjacent to the instantaneous jump profile 13*b*'. That is the instant which marks the stopping of the arming step and the beginning of the instantaneous jump step. This position, at the "cam summit", is illustrated in FIGS. 26 and 27. At this instant, the instantaneous jump cam 13' becomes a driver and the runner 31' travels instantaneously along the instantaneous jump profile 13*b*' to arrive at the stop profile 13*c*'. All of the energy necessary for the date transition, stored up hitherto by the energy accumulation device in the arming step, is then restored for the instantaneous driving of the date display mobile unit 50'. In this instantaneous jump step, the driving member 23', the jumper cam 22' and the instantaneous jump cam 13' advance freely and instantaneously by virtue of the degree of freedom in rotation conferred on the stud 18' in the oblong cutout 11*a*'. The angular amplitude of this oblong cutout 11*a*' is, here, sufficiently great for the driving member 23' to be able to travel the angular extent defined by the geometry of the instantaneous jump cam 13', more particularly defined by the geometry of the profile 13*b*' of the instantaneous jump cam 13'**.

As for the device of the first embodiment, the spring 40*a'* of the jumper 40' is disarmed in the first, approach substep of the instantaneous jump step of the driving device 80' to reduce the energy consumption in the second, driving substep of the instantaneous jump step of the driving device 80'. The spring 40*a'* is then rearmed in the third stop substep of the driving device 80', in order for the spring 40*a'* to be rearmed at the end of the instantaneous jump step of the driving device 80'.

After the date transition, the stud 18' is caught by the oblong cutout 11*a'* of the driving wheel 11'. This catching will last for the time it takes for the oblong cutout 11*a'* to catch the angular extent travelled by the driving member 23' necessary for the lead of the mobile unit 50'. Once the oblong cutout 11*a'* is once again in contact with the stud 18', the system will begin a new arming step and thus recommence accumulating energy by arming the spring 30*a'* of the driving lever 30' by virtue of the arming profile 13*a'* of the instantaneous jump cam 13'.

As described previously and in a way similar to the position-holding device 40 of the first embodiment, the position-holding device 40' can be actuated according to different substeps by the activation and deactivation device 70'. A fourth substep of deactivation of the position-holding device 40' by the activation and deactivation device 70' is applied in the instantaneous jump step of the driving device 80', more particularly in the first substep of approach of the driving device 80'. A fifth substep of activation of the position-holding device 40' by the activation and deactivation device 70' is also applied in the instantaneous jump step of the driving device 80', more particularly in the third substep of stopping of the driving device 80'.

The driving and position-holding system 90' thus comprises the following operating steps:

- a step of arming of the driving device 80';
- a step of instantaneous jump of the driving device 80', which breaks down according to the following different substeps:
  - a first substep of approach;
  - a second, driving substep;
  - a third, stopping substep;
  - a fourth substep of deactivation of the position-holding device 40' by the activation and deactivation device 70';
  - a fifth substep of activation of the position-holding device 40' by the activation and deactivation device 70'.

Preferably, whatever the embodiment, the driving cam 13; 13' and the driving lever 30; 30' are arranged so as to drive, instantaneously, the time or time derivative information display mobile unit 50; 50'.

Preferably, whatever the embodiment, the coupling device comprises a link securing, according to at least one degree of freedom, the driving cam 13; 13' to the deactivation cam 22; 22'.

According to the first embodiment, the coupling device advantageously comprises a gear 12, 21 linking the driving cam 13 and the deactivation cam 22.

According to the second embodiment, the coupling device advantageously comprises a stud or a pin 18' linking the driving cam 13' and the deactivation cam 22'. It is then an embedding connection or a rigid joint between the driving cam 13' and the deactivation cam 22'.

Preferably, whatever the embodiment, the system, in particular the driving lever 30; 30', comprises a driving lever return spring 30*a*; 30*a'*.

Preferably, whatever the embodiment, the device 40; 40' for holding the mobile unit in position comprises a jumper 40; 40' comprising:

- a jumper body 40*b*; 40*b'*, and
- a jumper spring 40*a*; 40*a'*, and
- the activation and deactivation device 70; 70' comprises an action element on the jumper body 40*b*; 40*b'* or on the jumper spring 40*a*; 40*a'*. In the embodiments described, the action is exerted on the jumper spring 40*a*; 40*a'*. The action element can be the runner 41; 41'. More generally, it can be any element or configuration of the spring 40*a*; 40*a'* coming into contact with the jumper cam 22; 22'. The action element can alternatively be an intermediate means arranged between the jumper cam 22; 22' and the jumper 40; 40'.

When the activation and deactivation device 70; 70' exerts an action or controls the body of the jumper 40*b*; 40*b'* rather than the spring 40*a*; 40*a'*, the position of the jumper 40; 40' can notably be modulated. Moreover the jumper 40; 40' could basically be a rigid lever, without return spring, which would latch and unlatch the mobile unit 50; 50' as a function of the position of the deactivation cam 22; 22'.

As illustrated previously, the jumper cam 22; 22' and the instantaneous jump cam 13; 13' can be directly secured to one another (notably by a rigid joint or an embedding connection) as in the second embodiment, or they can be linked kinematically by an intermediate gear train as in the first embodiment. Other link means could be arranged such as a chain of intermediate wheels, or a driving finger.

Whatever the embodiment, the jumper cam 22; 22' could simultaneously control jumpers for, for example, several mobiles units or displays. In particular, it could comprise several distinct levels for the control of these multiple jumpers. Additionally or alternatively, the jumper cam 22; 22' can be kinematically linked to other jumper cams.

In the embodiments described previously, a one-way connection device 14 and an oblong cutout 11*a'* cooperating with a stud 18' were arranged in order to be able to decouple the base movement from the instantaneous jump cam when the latter is a driving cam during the instantaneous jump step. Any other decoupling device that makes it possible to give the system a degree of freedom necessary for the instantaneous jump of a mobile unit could be arranged here, such as, for example, a portion of toothing missing on the driving wheel or another freewheel system.

In the embodiments described previously, a runner 41; 41' is arranged at the end of the spring 40*a*; 40*a'* of the jumper 40; 40'. The runner makes it possible to limit the friction with the jumper cam 22; 22'. However, this arrangement is not essential. The system could very well operate without this runner, by having one of the ends of the spring 40*a*; 40*a'* directly bearing on the jumper cam 22; 22'.

Like the jumper 40; 40', the driving lever 30; 30' could also not have a runner 31; 31' at its end.

The driving member 23; 23' could also be simplified by having basically a single rigid finger or a single elastic finger to effect the lead of the mobile unit 50; 50' and the stopping thereof.

The driving and position-holding system 90; 90' could also be used in any other calendar system and/or in any other system necessitating an instantaneous transition of a function or of a display with an indexing and/or a maintaining of this function or of this display. It would for example be possible to shrewdly arrange this driving and position-holding system to drive a mobile unit displaying the hour of the current time.

The driving and position-holding system 90; 90' described could also be transposed to a display system comprising another date display member such as, for example, a hand display. Moreover, the date display system could comprise several date display members, as is for example the case in a "large date" type system.

One embodiment of a method for operating the driving and position-holding system 90; 90' as described previously and/or the horological calendar system 100; 100' as described previously and/or the movement 110; 110' as described previously and/or a timepiece 120; 120' as described previously is described hereinbelow.

The operating method comprises a step of instantaneous jump of the driving device 80; 80' comprising the following substeps:

- a first substep of approach of the driving device 80; 80';
- a fourth substep of deactivation of the position-holding device 40; 40' by the activation and deactivation device 70; 70' simultaneous with the first substep of approach of the driving device 80; 80';
- a second substep of driving of the driving device 80; 80';
- a third substep of stopping of the driving device 80; 80';
- a fifth substep of activation of the position-holding device 40; 40' by the activation and deactivation device 70; 70' simultaneous with the third substep of stopping of the driving device 80; 80'.

More particularly, the instantaneous jump step of the driving device 80; 80' comprises the following substeps:

- a first substep of approach of the driving device 80; 80', and
- a fourth substep of deactivation of the position-holding device 40; 40' by the activation and deactivation device 70; 70' simultaneous with the first substep of approach of the driving device 80; 80', and
- a second substep of driving of the driving device 80; 80', the deactivated state of the position-holding device 40; 40' being maintained during the second substep of driving of the driving device 80; 80', and
- a third substep of stopping of the driving device 80; 80', and
- a fifth substep of activation of the position-holding device 40; 40' by the activation and deactivation device 70; 70' simultaneous with the third, stopping substep, the activated state of the position-holding device 40; 40' being maintained until the next first substep of approach of the driving device 80; 80' (of the next instantaneous jump step).

In other words, the method makes it possible to drive the mobile unit 50; 50' even though the position-holding device 40; 40' is deactivated. Moreover, it makes it possible to reactivate the position-holding device 40; 40' during the very instantaneous jump step of the mobile unit 50; 50'.

Figure 28:
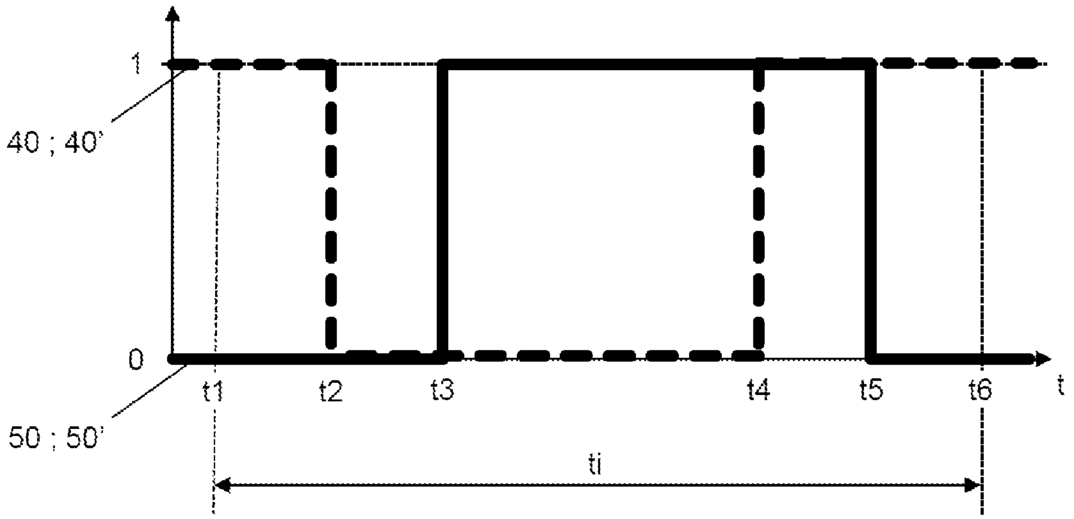
FIGS. 28 and 29 consist of timing diagrams illustrating the activations of the elements of a timepiece in the implementation of the method for operating a calendar system according to the invention.

FIG. 28 makes it possible to illustrate a preferred embodiment of a method of operation of the system 90; 90'. More particularly, FIG. 28 illustrates a timing diagram comprising an X axis representing the time t, and a Y axis representing the respective states of the position-holding device 40; 40' and of the driving device of the mobile unit 50; 50'. In particular, the ordinates 0 and 1 correspond respectively to the deactivated and activated state of the position-holding device 40; 40', and, respectively, to the stopping and the driving of the mobile unit 50; 50'. The time interval over which the method extends is represented by ti which is located between the abscissae t1 and t6 which correspond respectively to the start and the end of the instantaneous jump step of the driving device 80, 80'.

These different states are strung together as follows:

- t1: start of the first, approach substep with the position-holding device 40; 40' which is in the activated state and the mobile unit 50; 50' which is stopped, then
- t2: start of the fourth substep of deactivation of the position-holding device 40; 40', then
- t3: while the position-holding device 40; 40' is in the deactivated state, the second substep of driving of the mobile unit 50; 50' begins, then
- t4: start of the third, stopping substep, after the driving device 80; 80', more particularly the beak 42; 42' of the jumper, has passed the summit of the toothing 50*a*; 50*a'*, and the beginning of the fifth substep of activation of the position-holding device 40; 40', then
- t5: while the position-holding device 40; 40' is in the activated state, the mobile unit 50; 50' is stopped, then
- t6: end of the instantaneous jump step, the position-holding device 40; 40' remains in the activated state.

Figure 29:
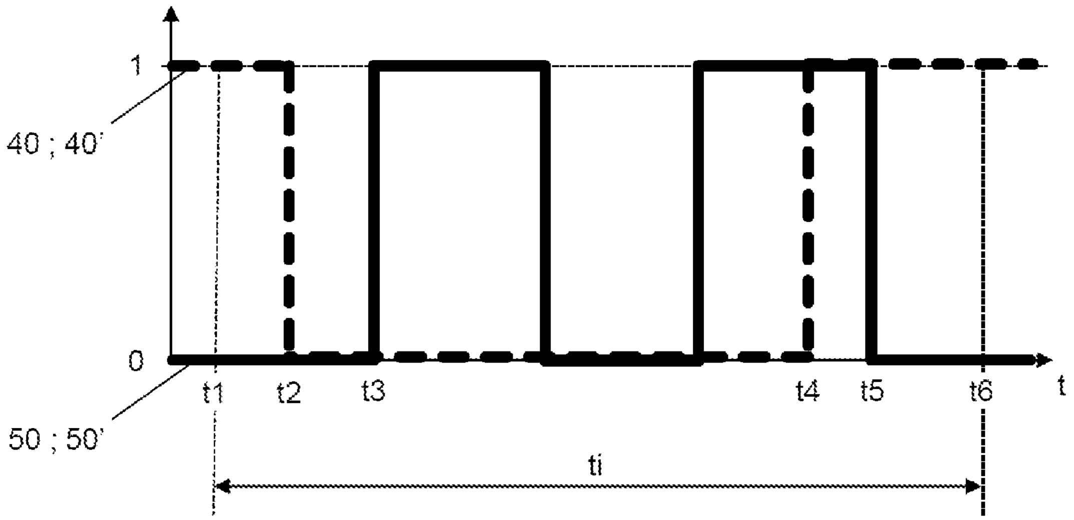

Alternatively, FIG. 29 illustrates, in the same way as FIG. 28, the different states of the position-holding device 40; 40' during two second driving substeps of the driving device 80; 80' of a display mobile unit 50; 50' which follow one another. This particular case could, for example, illustrate a date transition at the end of a short month of an annual, semi-perpetual or perpetual calendar system, between the date on the 30th and the 1st of the next month. This figure also shows the fact that the position-holding device 40; 40' would advantageously be deactivated and activated only once throughout the time interval corresponding to the two instantaneous jumps, notably at the two second driving substeps. By extension, it would also be possible to multiply the driving substeps, for example to allow three, or even four successive date jumps, notably for the date transition from the 28th to the 1st of the next month of a semi-perpetual or perpetual calendar. In this case also, the position-holding device 40; 40' would advantageously be deactivated and activated only once throughout the time interval corresponding to the multiple instantaneous jumps. Such an operating method is thus particularly advantageous in the context of a semi-perpetual or perpetual calendar. The multiple second driving substeps can be considered as a single driving substep of several pitches of the time or time derivative information display mobile unit 50; 50'.

Figure 31:
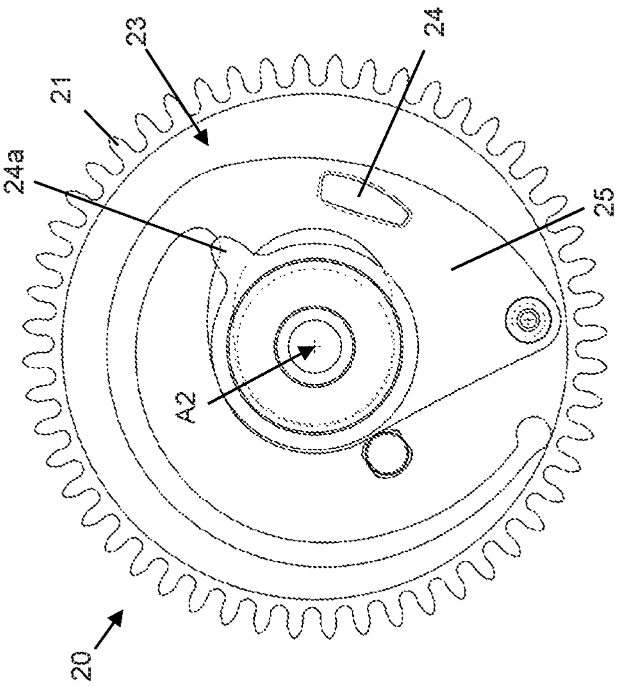
FIGS. 30 and 31 illustrate a variation of a calendar system according to the invention.
Figure 30:
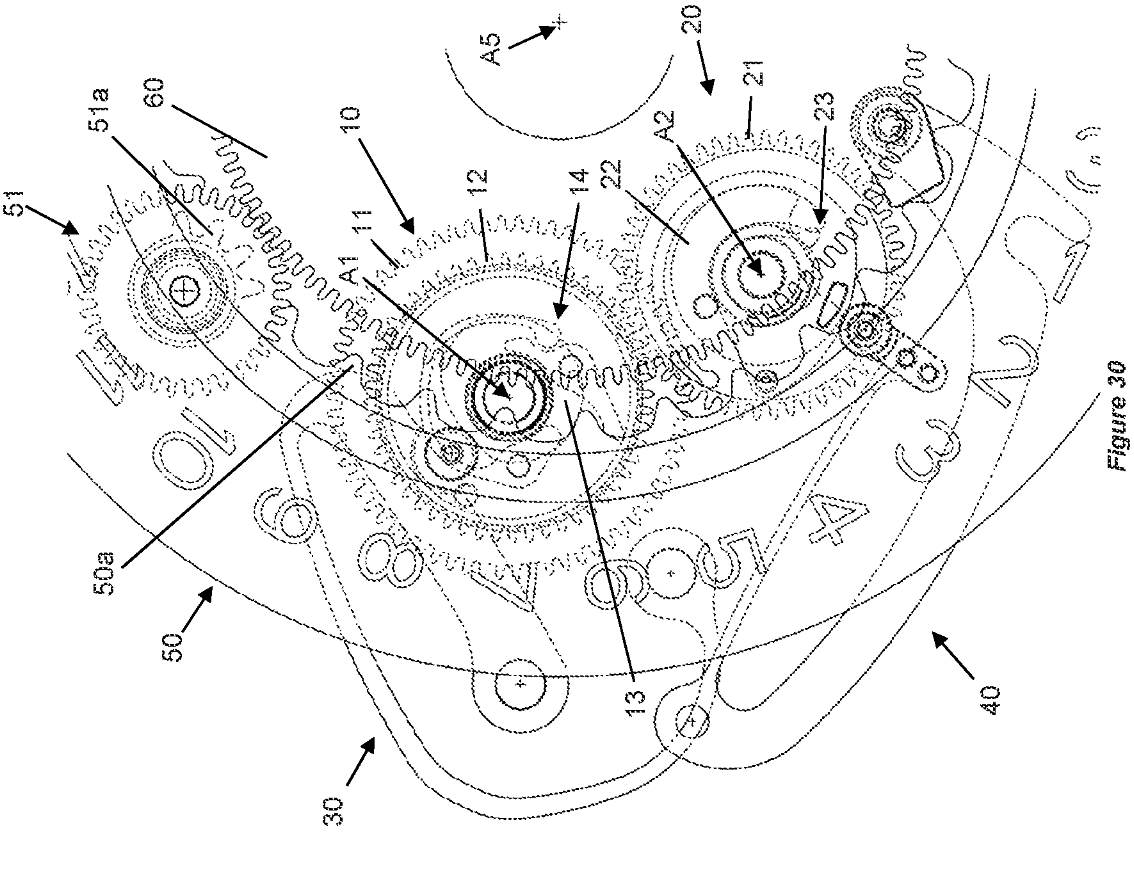

By way of example, FIGS. 30 and 31 illustrate a variation of a horological calendar system 100. In this particular variation, the calendar system is an annual calendar system whose operating principle is known from the document EP1596261. More particularly, in this variation, the display mobile unit 50 bears a planetary mobile 51 meshing with a sun wheel 60. The planetary mobile 51 is provided with a planetary pinion 51*a* of four teeth corresponding to the four months of the year that have 30 days, which meshes with the fixed toothing of the sun wheel 60. The toothing ratios of the planetary mobile 51 and of the sun wheel 60 are chosen so that, at the end of each 30-day month, one of the teeth of the planetary pinion 51*a* is situated in the trajectory of an additional finger 24*a* secured to the jumper cam 22 and the instantaneous jump cam 13 via, here, the coupling device 12, 21.

The additional finger 24*a* is offset angularly with respect to the first member 24 of the driving member 23. In the instantaneous jump step, because of the angular offset between the first member 24 and the additional finger 24*a*, it is the additional finger 24*a* which first encounters one of the teeth of the planetary pinion 51*a* and displaces the display mobile 50 by one pitch, making it transition from 30 to 31 then, during the same instantaneous jump step, the first member 24 takes over and drives a tooth of the toothing 50*a* of the display mobile unit 50 by a second pitch, making it transition from 31 to 1. Thus, during the same instantaneous jump step, the display mobile unit 50 transitions from 30 to 1, therefore undergoing two second driving substeps.

As in the mechanism described in EP 1 596 261, the first member 24 and the additional finger 24*a* are both secured to the instantaneous jump cam 13 via, here, the coupling device 12, 21. Although arranged here on the same driving mobile unit 20, the first member 24 and the additional finger 24*a* could be arranged on two distinct driving mobile unit. More broadly, there could be as many driving mobiles units secured to the instantaneous jump cam 13 as driving members of the display mobile unit 50.

FIGS. 28 and 29 illustrate transitions by unit-step between the different states. Obviously, these transitions can exhibit, for example, a slope and not change state as abruptly.

More preferably, the activation of the position-holding device 40; 40', more particularly the switching of the position-holding device 40; 40' to the activated state, is executed after a point of equilibrium of the position-holding device has been crossed, in particular after a summit of a tooth of the indexing toothing 50*a*; 50*a'* has been crossed by the jumper beak 42; 42'.

As alternatives:

the position-holding device 40; 40' could be maintained in the deactivated state at least throughout the driving of the mobile unit 50; 50', or the position-holding device 40; 40' could switch to the deactivated state after the start of the driving of the mobile unit 50; 50'.

By virtue of the solutions described, it is possible to control the arming of a jumper indexing a mobile unit. This is made possible by the arrangement of a jumper cam linked kinematically to an instantaneous jump cam. The instantaneous jump cam, with its elastic lever, makes it possible to accumulate the energy necessary for the jump. As for the jumper cam, it is configured so as to disarm the jumper only during some substeps which make up the instantaneous jump step of the mobile unit or instantaneous jumps of the mobile unit, upon the restoration of the energy accumulated by the elastic lever cooperating with the instantaneous jump cam. Before and after the instantaneous jump step, the jumper thus operates conventionally, and does so with an optimal arming for the positioning and holding of the mobile in position. The arrangement of such a system therefore does not affect the user, for example in the fast correction of the date.

Furthermore, by virtue of its configuration, the instantaneous jump cam advantageously makes it possible to induce an energy consumption that is constant and distributed throughout the arming step, or at least during most of the arming step. Therefore, the advantage of obtaining a reduced energy consumption by virtue of the implementation of a jumper cam is aggregated with the advantage of best distributing this energy consumption throughout the arming step. The result thereof is therefore an optimized energy consumption that makes it possible to reduce the amplitude variations on the regulating member and therefore the negative impact on the chronometry.

Furthermore, the one-way connection device is arranged upstream of said cams. Advantageously, this device prevents the user from having the system in a configuration in which the jumper would be disarmed. It is therefore not possible to set this system in a configuration in which the jumper is disarmed other than during the instantaneous jump or jumps corresponding to the date transition.

Throughout this document, “indexing of a mobile unit” is understood to mean the definition of different stable positions of the mobile unit. These stable positions are defined by the device for holding the mobile unit in position. These stable positions are separated by a continuum of unstable intermediate positions. The driving device makes it possible to switch the mobile unit from one stable position to another, via a continuum of unstable intermediate positions. Between two stable positions or two indexed positions or two indexing positions, the mobile unit transitions transiently through a continuum of unstable intermediate positions.

The device for activating and deactivating the position-holding device makes it possible to activate or deactivate the mobile unit holding device. Preferably, throughout this document, it is considered that, most of the time (apart from some substeps in the instantaneous jump or jumps of the mobile unit), the position-holding device is activated or active, that is to say that it generates a nominal torque for indexing or holding the mobile unit in position. The activation and deactivation device then activates the position-holding device. Preferably, throughout this document, it is considered that, in some situations (in some substeps in the instantaneous jump or jumps of the mobile unit), the holding device is deactivated or inactive, that is to say that it does not generate torque for indexing or holding the mobile unit in position or, preferably, that it generates a reduced torque for indexing or holding the mobile unit in position. The reduced torque is lower than the nominal torque.

Preferably, throughout this document, “synchronizing the driving cam and the deactivation cam” is understood to mean that during each action of the driving device (driving phase), the device for position-holding is configured in a deactivated state, notably all the devices for position-holding are configured in a deactivated state, in case where several devices for position-holding are provided. As a consequence of the disclosed embodiments, the link securing, according to at least one degree of freedom, the driving cam 13; 13' to the deactivation cam 22; 22' is permanent.

Preferably, throughout this document, “instantaneous” is understood to mean a duration of the order of one or more fractions of a second.

Regarding the method for operating the driving and position-holding system 90; 90' as described previously and/or the horological calendar system 100; 100' as described previously and/or the movement 110; 110' as described previously and/or a timepiece 120; 120' as described previously, “simultaneous” is preferably used to qualify substeps which do not necessarily begin and/or end at the same instants but which at least partially overlap in time.

In other words, the operating method preferably comprises:

a substep of deactivation of the position-holding device 40; 40', and a substep of driving of the mobile unit 50; 50', the deactivation and driving substeps taking place simultaneously.

For example, the operating method can comprise the succession of the following substeps:

switching of the position-holding device (40; 40') to the deactivated state, then driving of the mobile unit (50; 50'), then switching of the position-holding device (40; 40') to the activated state.

The invention claimed is:

1. A system for driving and holding in position a mobile unit for displaying time or time derivative information, comprising:

a driving device for driving the mobile unit, the driving device comprising a driving cam and a driving lever provided to drive a driving member, a device for holding the mobile unit in position, a device for activating and deactivating the position-holding device comprising a deactivation cam, and a device for mechanically coupling or synchronizing the driving cam and the deactivation cam, wherein the mechanical coupling or synchronizing is one-to-one so that, in each driving phase actuated by the driving cam, at a time when the driving cam causes the driving member to drive the mobile unit, the device for mechanically coupling or synchronizing causes the deactivation cam to hold the position-holding device in a deactivated state.

2. The system as claimed in claim 1, wherein the driving cam and the driving lever are arranged so as to drive, instantaneously, the display mobile unit for displaying time or time derivative information.

3. The system as claimed in claim 2, wherein the coupling device comprises a gear linking the driving cam and the deactivation cam.

4. The system as claimed in claim 2, wherein the coupling device comprises a link securing, according to at least one degree of freedom, the driving cam to the deactivation cam.

5. The system as claimed in claim 2, wherein the system comprises a driving lever return spring.

6. The system as claimed in claim 1, wherein the coupling device comprises a gear linking the driving cam and the deactivation cam.

7. The system as claimed in claim 1, wherein the coupling device comprises a link securing, according to at least one degree of freedom, the driving cam to the deactivation cam.

8. The system as claimed in claim 7, wherein the link securing, according to at least one degree of freedom, the driving cam to the deactivation cam comprises an embedding connection or a rigid joint between the driving cam and the deactivation cam implemented by a stud.

9. The system as claimed in claim 1, wherein the system comprises a driving lever return spring.

10. The system as claimed in claim 1, wherein the driving device comprises a driving wheel and a one-way connection device linking the driving wheel and the driving cam.

11. The system as claimed in claim 1, wherein the driving device comprises a driving wheel and a mechanical connection linking the driving wheel and the driving cam, the mechanical connection having an angular play in rotation about an axis of rotation of the driving wheel and/or of the driving cam.

12. The system as claimed in claim 1, wherein at least one of the following:

(i) the device for holding the mobile unit in position comprises a jumper comprising:

a jumper body, and a jumper spring, and the activation and deactivation device comprises an action element on the jumper body, (ii) the device for holding the mobile unit in position comprises a jumper comprising:

a jumper body, and a jumper spring, and the activation and deactivation device comprises an action element on the jumper spring.

13. A horological calendar system comprising:

a mobile unit for displaying time or time derivative information, and a driving and position-holding system as claimed in claim 1.

14. A horological movement comprising the driving and position-holding system as claimed in claim 1.

15. A timepiece comprising the horological movement as claimed in claim 14.

16. A method for operating a driving and position-holding system as claimed in claim 1, the method comprising carrying out an instantaneous jump of the driving device by:

approaching the driving device;

deactivating the position-holding device by the activation and deactivation device, simultaneous with the approach of the driving device;

driving the driving device;

stopping the driving device; and activating the position-holding device by the activation and deactivation device, simultaneous with the stopping of the driving device.

17. The operating method as claimed in claim 16, wherein:

the deactivated state of the position-holding device is maintained during the driving of the driving device, and the activated state of the position-holding device is maintained until a next approach of the driving device.

18. The operating method as claimed in claim 16, wherein the driving of the driving device is part of driving at least two pitches of the mobile unit for displaying time or time derivative information.

19. The operating method as claimed in claim 16, wherein the approaching, deactivating, driving, stopping and activating are implemented exclusively when the driving lever drives the driving cam.

20. The operating method as claimed in claim 16, wherein the approaching, deactivating, driving, stopping and activating are implemented instantaneously.

* * * * *